US012741761B2

(12) United States Patent
Tao et al.

(10) Patent No.: US 12,741,761 B2
(45) Date of Patent: Sep. 22, 2026

(54) SYSTEMS AND METHODS FOR A WHOLE-BODY GRASPING AND PERCHING DRONE

(71) Applicants: Weijia Tao, Mesa, AZ (US); Karishma Patnaik, Tempe, AZ (US); Fuchen Chen, Mesa, AZ (US); Yogesh Kumar, Tempe, AZ (US); Wenlong Zhang, Chandler, AZ (US)

(72) Inventors: Weijia Tao, Mesa, AZ (US); Karishma Patnaik, Tempe, AZ (US); Fuchen Chen, Mesa, AZ (US); Yogesh Kumar, Tempe, AZ (US); Wenlong Zhang, Chandler, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 0 days.

(21) Appl. No.: 18/974,203

(22) Filed: Dec. 9, 2024

(65) Prior Publication Data

US 2025/0187760 A1 Jun. 12, 2025

Related U.S. Application Data

(60) Provisional application No. 63/608,099, filed on Dec. 8, 2023.

(51) Int. Cl.
*B64U 20/70* (2023.01)
*B25J 9/10* (2006.01)
*B64U 70/00* (2023.01)

(52) U.S. Cl.
CPC .............. *B64U 20/70* (2023.01); *B25J 9/102* (2013.01); *B64U 70/00* (2023.01)

(58) Field of Classification Search
CPC ........ B64U 30/20; B64U 20/40; B64U 20/50; B64U 20/70; B64D 1/22
(Continued)

(56) References Cited

U.S. PATENT DOCUMENTS 4,968,077 A * 11/1990 Redmon, Jr. ............ B65G 7/12 294/16
11,453,480 B2 * 9/2022 Poltorak .................. B64D 1/22
(Continued)

FOREIGN PATENT DOCUMENTS

CN 107953353 A * 4/2018 .......... B25J 15/0213

OTHER PUBLICATIONS

Mintchev, S. et al., "Adaptive Morphology: A design principle for Multimodal and Multifunctional robots," IEEE Robotics & Automation Magazine, vol. 23, No. 3, Sep. 2016, pp. 42-54.
(Continued)

*Primary Examiner* — Arfan Y. Sinaki
(74) *Attorney, Agent, or Firm* — Polsinelli PC

(57) ABSTRACT

An unmanned aerial vehicle includes a plurality of arms coupled along a body, each arm of the plurality of arms including: a linkage structure configurable in a first linkage state, a second linkage state, and a third linkage state. The vehicle can further include an actuation mechanism including: a ratchet gear having a contact surface that applies a lateral force against a leading link of the linkage structure to transition the linkage structure from the first linkage state to the second linkage state or the third linkage state; a bistable spring that transitions from a first spring state to a second spring state upon application of the lateral force against the leading link of the linkage structure; and a cable for straightening the linkage structure.

20 Claims, 20 Drawing Sheets

(58) Field of Classification Search
USPC .................................. 294/198, 86.19, 86.27
See application file for complete search history.

(56) References Cited

U.S. PATENT DOCUMENTS

| | | | | |
|---|---|---|---|---|
| 11,661,217 | B2 * | 5/2023 | Barnhart ................ | B64G 1/648 244/172.4 |
| 11,679,511 | B2 * | 6/2023 | Smith .................... | B25J 9/1065 294/198 |
| 12,208,931 | B2 * | 1/2025 | Kiyokami ............. | B64C 39/024 |
| 12,263,588 | B2 * | 4/2025 | Harrison .................. | B25J 9/102 |
| 2004/0058765 | A1 * | 3/2004 | Kubein-Meesenburg .................. | F16G 13/20 474/206 |
| 2022/0151718 | A1 * | 5/2022 | Sachs ................. | A61B 17/2909 |

OTHER PUBLICATIONS

Patnaik, K. et al., "Design and Control of Squeeze: A Spring-augmented QUadrotor for interactions with the Environment to squeeZE-and-fly," in IEEE/RSJ International Conference on Intelligent Robots and Systems, Oct. 25-29, 2020, pp. 1364-1370.

Roderick, W. R. et al., "Touchdown to take-off: at the interface of flight and surface locomotion," Interface focus, vol. 7, No. 1, downloaded Mar. 4, 2026, pp. 1-15.

Mishra, S. et al., "Design and Control of a Hexacopter with Soft grasper for Autonomous Object Detection and Grasping," in Dynamic Systems and Control Conference, vol. 51913, American Society of Mechanical Engineers, Sep. 30-Oct. 3, 2018, pp. 1-9.

Mishra, S. et al., "A Disturbance Observer Approach with Online Q-Filter Tuning for Position Control of Quadcopters," in American Control Conference, May 24-26, 2017, pp. 3593-3598.

McLaren, A. et al., "A passive closing, tendon driven, adaptive robot hand for ultra-fast, aerial grasping and perching," in IEEE/RSJ International Conference on Intelligent Robots and Systems, Nov. 4-8, 2019, pp. 5602-5607.

Hoffman, K. A. et al., "Bird-inspired robotics principles as a framework for developing smart aerospace materials," Journal of Composite Materials, vol. 57(4), Jan. 20, 2023, 32 pages.

Fisherman, J. et al., "Dynamic Grasping with a "Soft" Drone: From Theory to Practice," in IEEE/RSJ International Conference on Intelligent Robots and Systems, Sep. 27 - Oct. 1, 2021, pp. 4214-4221.

Doyle, C. E. et al., "An Avian-Inspired Passive Mechanism for Quadrotor Perching," IEEEASME Transactions On Mechatronics, vol. 18, No. 2, Apr. 2013, pp. 506-517.

Hang, K. et al., "Perching and resting-a paradigm for UAV maneuvering with modularized landing gears," Science Robotics, vol. 4, No. 28, Mar. 13, 2019, pp. 1-10.

Kirchgeorg, S. et al., "Hedgehog: Drone perching on tree branches with high-friction origami spines," IEEE Robotics and Automation Letters, Jan. 1, 2021, pp. 602-609.

Zhang, H., Biologically Inspired Perching for Aerial Robots,: PhD thesis, Colorado State University, 202, 114 pages.

Nguyen, H.-N. et al., "A Passively Adaptive Microspine Grapple for Robust, Controllable Perching," in 2019 2nd IEEE International Conference on Soft Robotics (RoboSoft), Apr. 14-18, 2019, pp. 80-87.

Thomas, J. et al., "Planning and Control of Aggressive Maneuvers for Perching on Inclined and Vertical Surfaces," in International Design Engineering Technical Conferences and Computers and Information in Engineering Conference, vol. 57144, American Society of Mechanical Engineers, 2015, 10 pages.

Lee, H. et al., "Risk-Aware Trajectory Planning Using Energy-Based Analysis for Aerial Vehicles," in AIAA Aviation Forum, Apr. 2-6, 2021, 13 pages.

KovaĈ, M. et al., "A perching mechanism for micro aerial vehicles," Journal of Micro-Nano Mechatronics, vol. 5, No. 3, May 4, 2010, pp. 77-91.

Roderick, W. et al., "Bird-inspired dynamic grasping and perching in arboreal environments," Science Robotics, vol. 6, No. 61, downloaded Mar. 4, 2026, 15 pages.

Nguyen, H.-N. et al., "A Soft-Bodied Aerial Robot for Collision Resilience and Contact-Reactive Perching," Soft Robotics, vol. 10, No. 4, Nov. 4, 2023, pp. 838-851.

Patnaik, K. et al., "Towards reconfigurable and flexible multi-rotors," International Journal of Intelligent Robotics and Applications, vol. 5, No. 3, Aug. 30, 2021, pp. 365-380.

Bucki, N. et al., "Design and Control of a Midair-Reconfigurable Quadcopter Using Unactuated Hinges," IEEE Transactions on Robotics, vol. 39, No. 1, Feb. 2023, pp. 539-557.

Zheng, P. et al., "Meta-morphic aerial robot capable of mid-air shape morphing for rapid perching," Scientific Reports, vol. 13, No. 1, 2023, pp. 1-14.

Lee, T. et al., "Geometric tracking Control of a Quadrotor UAV on SE (3)," 49th IEEE Conference on Decision and Control, Dec 15-17, 2010, pp. 5420-5425.

Patnaik, K. et al., "Adaptive Attitude Control for Foldable Quadrotors," IEEE Control Systems Letters, vol. 7, Jan. 18, 2023, pp. 1291-1296.

* cited by examiner

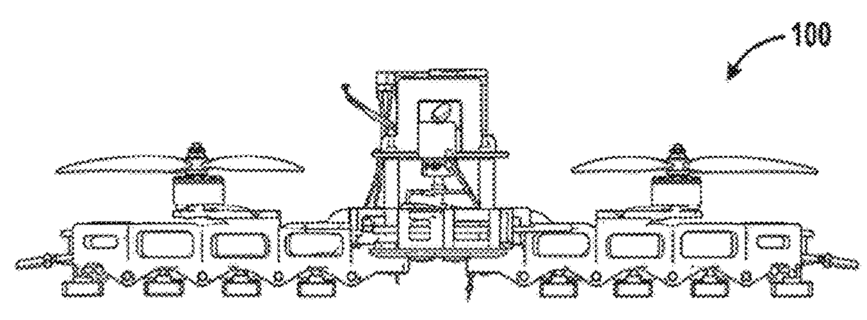
FIG. 1B
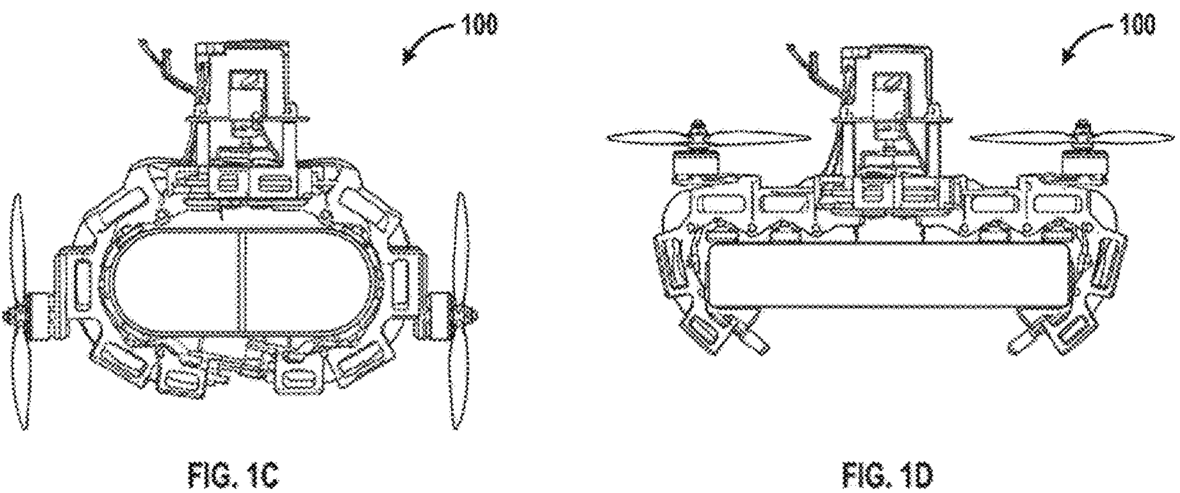
FIG. 1C
FIG. 1D (i) Takeoff, Hover and Perching (ii) Recovery, Retrieval and Landing

SYSTEMS AND METHODS FOR A WHOLE-BODY GRASPING AND PERCHING DRONE

CROSS REFERENCE TO RELATED APPLICATIONS

This is a non-provisional application that claims benefit to U.S. Provisional Application Ser. No. 63/608,099, filed on Dec. 8, 2023, which is herein incorporated by reference in its entirety.

FIELD

The present disclosure generally relates to a drone, and particularly to systems and methods for a whole-body grasping and perching drone.

BACKGROUND

Nature has always inspired researchers to design flying robots that can mimic their avian counterparts. It is incredible how birds can effectively leverage their bodies and navigate through narrow spaces and perform high-speed grasping and perching on irregular objects. With constant efforts to obtain these agile flying characteristics, researchers have started endowing conventional multirotor drones with various abilities such as folding, perching, and grasping towards various ends. In particular, perching has many applications that can be exploited by flying robots to maintain a critical surveillance position and conserve energy. However, a perching maneuver involves physical interactions with the target object and is prone to impact forces, making it critical to design a compliant and robust grasper for various sizes of the perching target for mission success.

It is with these observations in mind, among others, that various aspects of the present disclosure were conceived and developed.

BRIEF DESCRIPTION OF THE DRAWINGS

FIG. 1B is a photograph showing a front view showing the vehicle in a first linkage state during a flying demonstration;

FIG. 1C is a photograph showing a front view showing the vehicle in a second linkage state during a perching demonstration;

FIG. 1D is a photograph showing a front view showing the vehicle in a third linkage state during a grasping demonstration.

FIGS. 2H and 21 are a pair of illustrations showing rotation of an actuation mechanism of the vehicle of FIGS. 2A-2F in a first rotational direction;

Corresponding reference characters indicate corresponding elements among the view of the drawings. The headings used in the figures do not limit the scope of the claims.

DETAILED DESCRIPTION

Figure 1A:
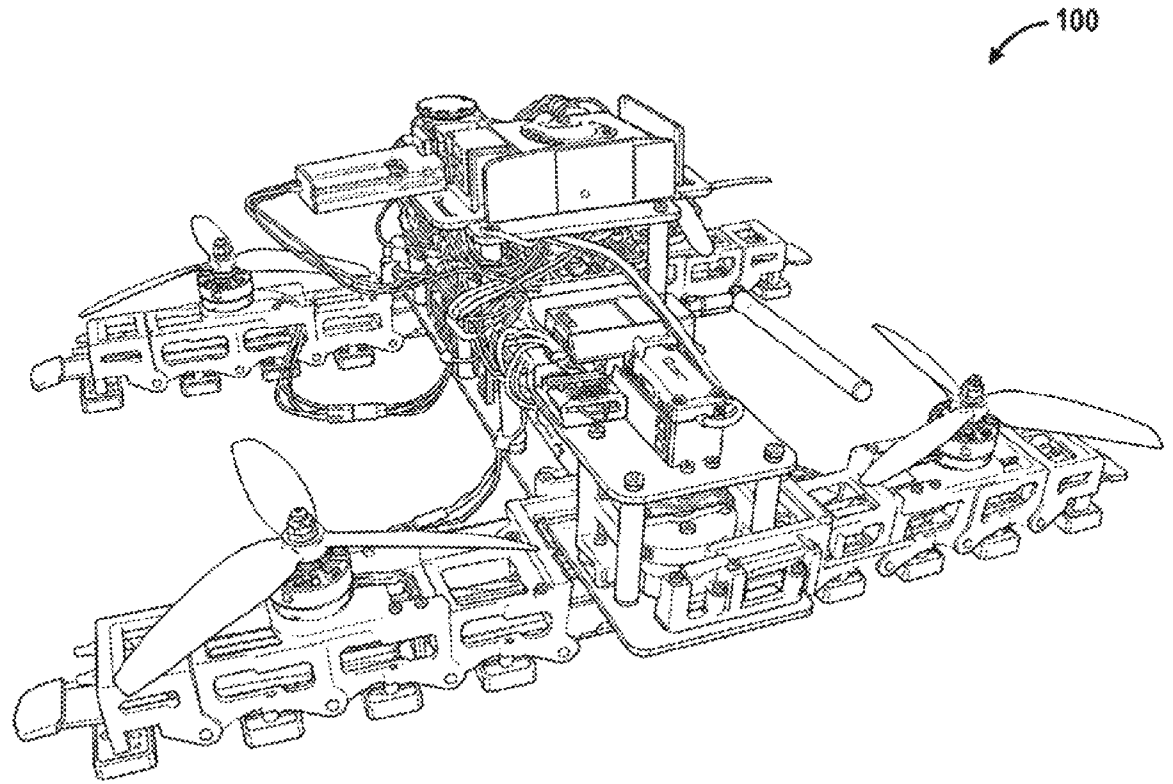
FIG. 1A is a photograph showing a perspective view of a vehicle that can perch and grasp.

Systems and methods are outlined herein that describe a vehicle (e.g., a drone) having a whole body for perching, which reduces the added weight and increases the grasp workspace of the drone and is also capable of partial body engagement for grasping objects. To date, this is the first time a multirotor drone has demonstrated autonomous whole-body perching and payload delivery without sacrificing controllability. It should be noted that the drone employs an active perching mechanism, unlike conventional impact-based passive perching, to attempt perching from different angles by the drone. To realize this concept, the drone incorporates a bistable structure inside its arms, which has been shown to enhance efficiency and stability in previous studies.

The drone also features a unique mechanism that utilizes servos to trigger and recover the bistable arms for perching, and propeller thrust to partially retract the arm for grasping while maintaining altitude stabilization. The drone in some embodiments has a motor-to-motor distance is 358 mm and weighs approximately 1.6 kg, including all the electronics and batteries. In some embodiments, the drone may be capable of achieving a maximum grasping force of around 40N, thereby allowing for robust grasping capabilities even in the presence of environmental disturbances.

There are generally two ways to achieve perching with a drone: one is to add a grasper on a drone, and the other one is to use its own body as the grasper. For the first case, researchers have designed compliant graspers to mitigate impact-induced disturbances. Soft bodies can withstand significantly higher interaction forces and can conform to irregular objects, making them excellent candidates for interaction-rich tasks. A soft aerial robot designed specifically for aerial manipulation tasks reported high success rates in the presence of interaction forces. However, this grasper was not validated for perching missions where the entire weight of the drone has to be accounted for by the grasper instead of relying on the motor thrust. Conventionally, custom-designed and add-on grasping mechanisms are employed for perching, which adds extra weight, reduces battery life, and limits the mission success to perches with certain sizes and shapes. The grippers proposed for nano and micro-aerial vehicles can seldom be scaled up for use in mini-drones because of the light-weight materials used to design the grasper which cannot hold the weight of the larger drones. Other perching mechanisms based off tethered cables, gecko-inspired designs and micro-spines constrain the flying space and the target location. More recently, perching mechanisms have been developed that harvest impact energy for activation and ensure secure perching. All these drones, however, try to address the problem of perching by attaching additional grasping mechanisms to the main body. In addition to the extra weights, these grasping mechanisms require the drone to be precisely controlled so that the perching target falls within the (oftentimes limited) workspace of the grasper.

For the second case, the drone arms are utilized as grasper fingers instead of adding a subsystem for grasping. A whole-body grasping drone was commercialized as a flyable and wearable micro-drone (motor-motor distance less than 150 mm) with limited autonomy. Mini drones with a compliant body, on the contrary, are tricky to design, owing to the large thrust ranges that they operate in, which can destabilize the drone by introducing undesired aerodynamic effects on the flexible arms. Thanks to the significant advancements in flexible and foldable drone research, mini-drones (motor-motor distance between 150 mm and 600 mm) have also recently been shown to perform perching Such designs, however, have limitations on the shape of the perch objects to ensure a successful perch, akin to the issues with rigid graspers. Another whole-body perching drone was recently proposed for perching and employs a bistable mechanism to engage the arms. However, all these designs do not demonstrate the capabilities of the drone for grasping an object and flying back, such as for payload delivery, therefore only solving perching ability and not pushing the boundaries for other applications.

Design and Fabrication

FIGS. 1A-2K show a drone (as vehicle 100) having a whole body for perching and grasping. The functional requirements for the drone include the ability to perch using its entire body as well as grasp objects with a portion of its body, with no additional energy consumption required during perching or grasping. Additionally, the drone may be capable of switching between different configurations and rejecting disturbances caused by the environment.

Arm Design

The arms of the drone are a crucial element of the design, with three distinct states, as shown in FIGS. 1B-1D and FIGS. 2C-2E. In State 0, the arm is in its normal position and remains straight, providing stability during flight. During State 1, the arm is fully coiled and engaged, enabling the drone to perch on objects of varying geometries. In State 2, the arm is partially retracted, allowing for conventional drone hovering, with the coiled tip of the arm still capable of transporting objects during flight. The drone arm design features a multi-link structure capable of bending and recovering in response to external forces (FIG. 2B). The arm is comprised of five 3D-printed links connected via metal pins, with a bistable tape spring located at the bottom of the arm providing gripping force. To optimize the arm's conformability with different objects, multiple links were incorporated, but too many links may sacrifice the rigidity of the arm. In addition, a physically locked structure was implemented with the links to prevent twisting and ensure one-direction bending.

The bistable tape spring was employed due to its ability to generate a sufficient gripping force, which is commonly used in products such as slap bracelets. To achieve a larger grasping force, the arm contains three layers of tape springs, which is the maximum number that the actuator can activate. Each link of the arm contains a slot that allows the tape spring to slide and buckle. As shown in FIG. 2B, a clearance is defined to allow the arm to slightly deflect upward when the cable is pulled and the curvature of the tape spring is fixed at the tip, which are both desired to unbuckle the tape spring as determined by experiments. Foam pads with friction tapes are also incorporated with the arm to enhance gripping strength.

Actuation Mechanism

To achieve a smooth transition between the three states, a specially designed actuation mechanism is shown in FIG. 2B. The actuation mechanism integrates several key components, including a ratchet-like center gear with spring-loaded retractable teeth, a spring-loaded linear slider, and a cable-driven system. The linear slider is used to trigger the arm to the engaged State 1 (FIG. 2D), while the cable-driven system can retract the arm back to its normal State 0 (FIG. 2C). Additionally, the motor and propeller thrust can bring the arm to a partially retracted State 2 (FIG. 2E). The cables connect all the arm links and are fastened to a pulley under center gear and are adjustable by a knob underneath. Since two arms of the drone share the center pulley and servo motor in the drone, compression springs are connected to the cables to make sure both arms of the drone can be fully retracted even if their cable lengths are slightly different (FIG. 2B). The servo motor is used to drive the center gear, and a motor with a propeller is mounted on the arm to provide thrust.

With a counterclockwise rotation of the gear, the cable is released, and the spring-loaded teeth on the center gear push the linear slider outward, producing a torque on each arm that triggers its movement to the engaged state. Once the movement is complete, the spring-loaded slider automatically returns to its initial position to prevent impediment to the link's motion when the motor thrust partially retracts the arm. The motor is mounted on the middle link of each arm, thereby enabling the remaining links of the arm to be utilized as an effective grasper for holding an object. With a clockwise rotation, each cable retracts, the teeth on the center gear are pushed back by the sliders, and the arm is backed to its normal state. The ratchet-like retractable teeth prevent the sliders from moving outward during this process. As a result, there is no conflicting motion when each arm is retracted by the respective cable. This mechanism also can drive the arm directly from the engaged State 1 to the normal State 0 when needed.

Drone Assembly

To construct the drone, two arms are attached to a central gear and are actuated synchronously. The frame of the drone consists of a fiberglass plate, which is both lightweight and highly durable. In some embodiments, two pairs of arms are mounted onto the plate. In some embodiments, a power distribution board and a layer of fiberglass are incorporated into the frame to securely attach all the necessary servos and electronics. The space between the layers and the top of the drone accommodates all the electronics, such as the flight controller batteries. In some embodiments, the drone uses the Pixhawk4 (Auterion, Zurich, Switzerland) commercial flight controller with an UPBoard (Intel Co. California, United States) as the high-level companion computer. Four brushless DC motors, Emax RS2205, with 6-inch propellers (Gemfan Flash 6042, Gemfanhobby Co. Ltd, Ningbo, China) are used for drone control generation. Two high-torque servo motors (DS3235SG270 35KG, Annimos, Shenzhen, China) are used for the arm activation. It also uses two BECs (ICE-20A-SB, GARTT, Shenzhen, China) to separately power the high-level companion computer at 5V and the servo motors for the arm activation at 7.4V. The drone's motor-to-motor distance measures 358 mm, and it is equipped with a Lipo battery (2200 mAh 50C 4S, Zeee Power Co. Ltd, Shenzhen, China). In some embodiments, the drone has an approximate weight of 1.6 kg.

Vehicle Overview

Referring to FIGS. 1A-2K, a vehicle 100 includes a body 102, a plurality of arms 104 coupled along the body 102, and an actuation mechanism 110 coupled along the body 102 that can configure the plurality of arms 104 in a first linkage state (state "0", FIG. 1B), a second linkage state (state "1", FIG. 1C), and a third linkage state (state "2", FIG. 1D). The vehicle 100 can be operable for flying when in the first linkage state, operable for grasping a perching structure when in the second linkage state, and operable for flying while grasping (e.g., carrying) an object when in the third linkage state.

Figure 2A:
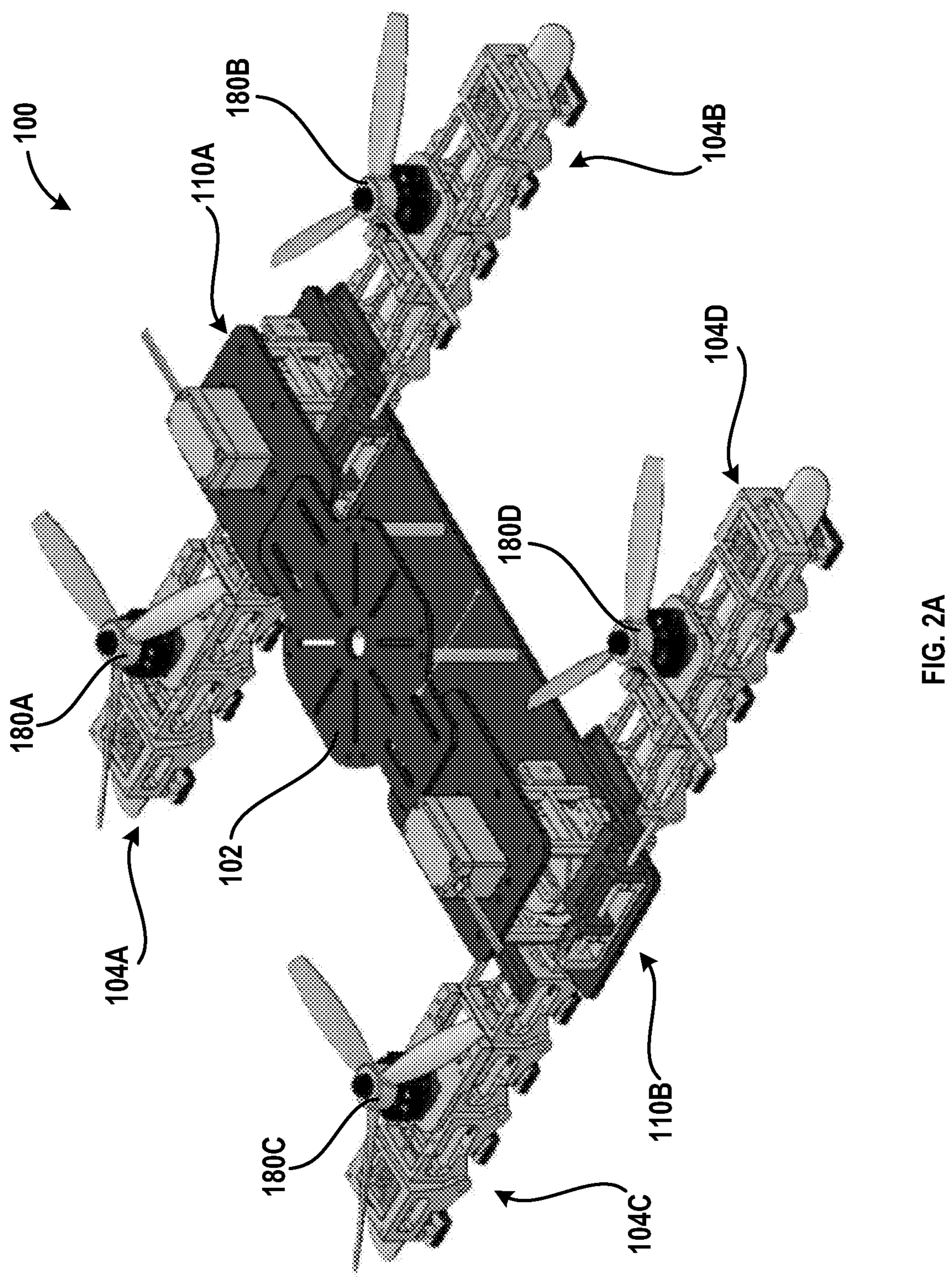
FIG. 2A is an illustration showing a top perspective view of the vehicle of FIGS. 1A-1D.
Figure 2B:
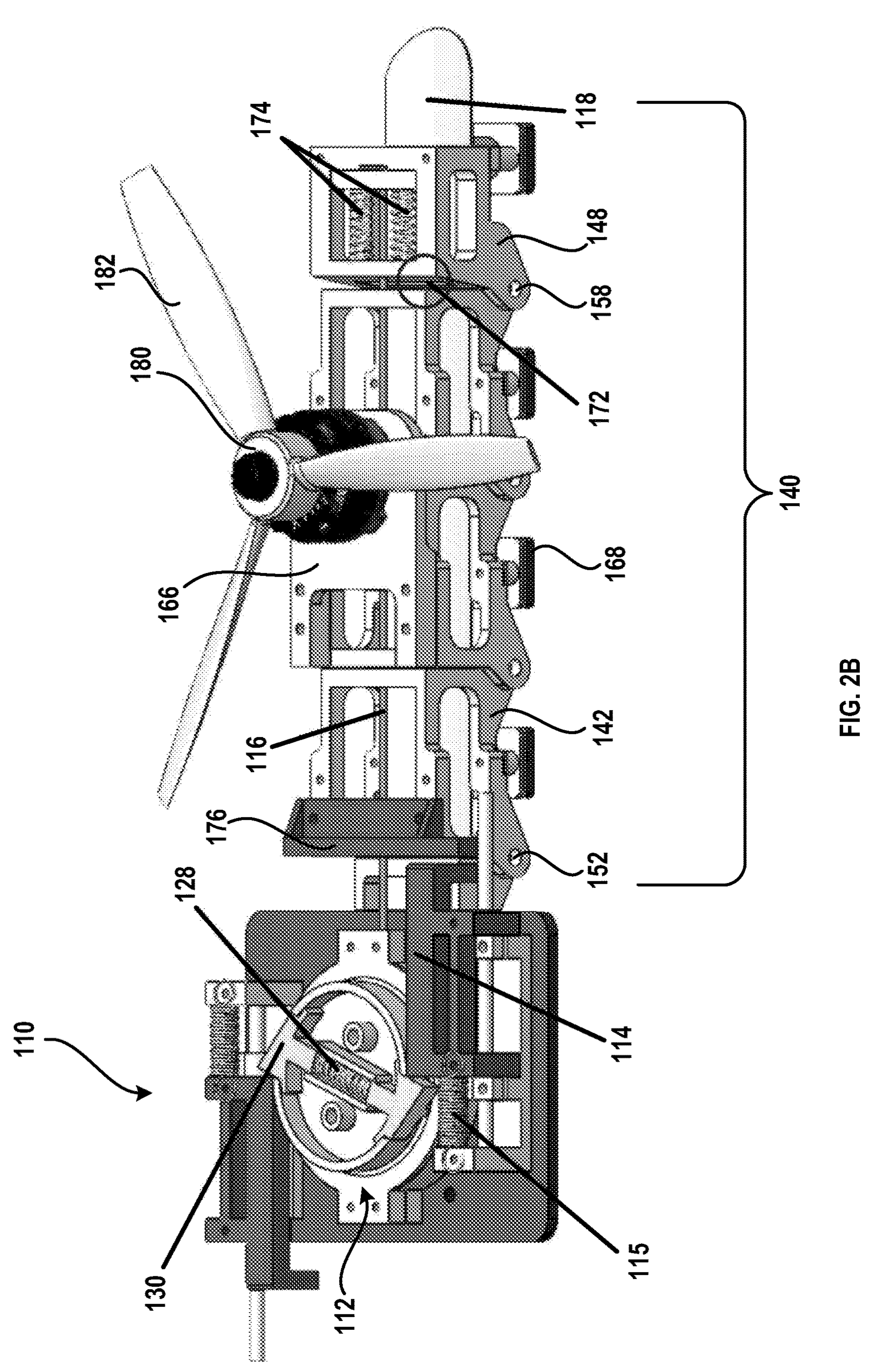
FIG. 2B is an illustration showing an arm design and actuation mechanism of the vehicle of FIG. 2A.
Figures 2C, 2D, 2E:
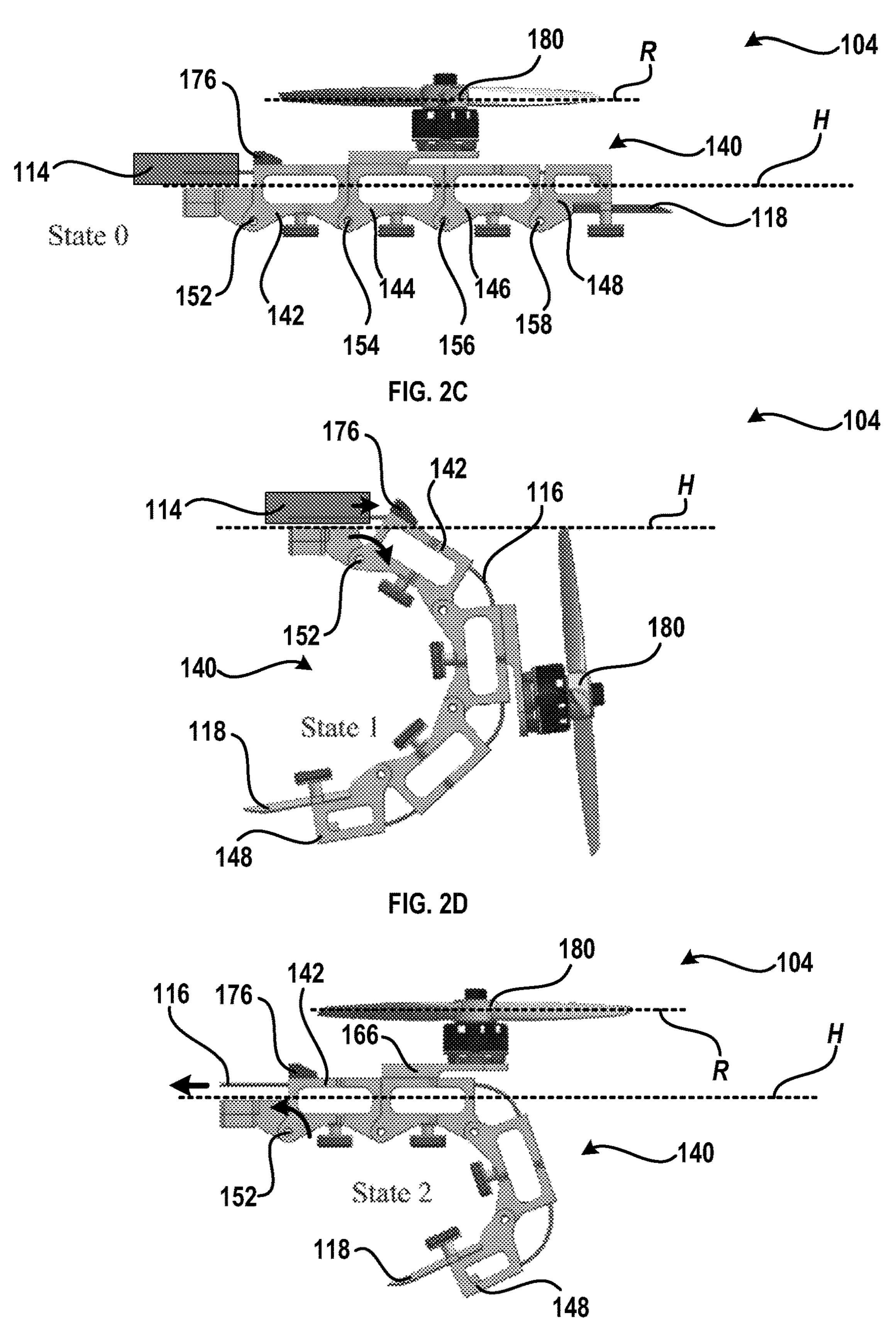
FIG. 2C is an illustration showing the vehicle in a first linkage state (state 0)
FIG. 2D is an illustration showing the vehicle in a second linkage state (state 1)
FIG. 2E is an illustration showing the vehicle in a third linkage state (state 2)

FIG. 2A shows one embodiment of the vehicle 100 including a first arm 104A, a second arm 104B, a third arm 104C, and a fourth arm 104D of the plurality of arms 104 which are coupled along the body 102 as shown. The vehicle 100 can include a first actuation mechanism 110A that can jointly configure the first arm 104A and the second arm 104B in the first linkage state, the second linkage state, or the third linkage state; likewise, the vehicle 100 can include a second actuation mechanism 110B that can jointly configure the third arm 104C and the fourth arm 104D in the first linkage state, the second linkage state, or the third linkage state. As further shown, each respective arm of the plurality of arms 104 can include a rotor, e.g., first arm 104A can include a first rotor 180A, second arm 104B can include a second rotor 180B, third arm 104C can include a third rotor 180C, and fourth arm 104D can include a fourth rotor 180D.

Figure 2F:
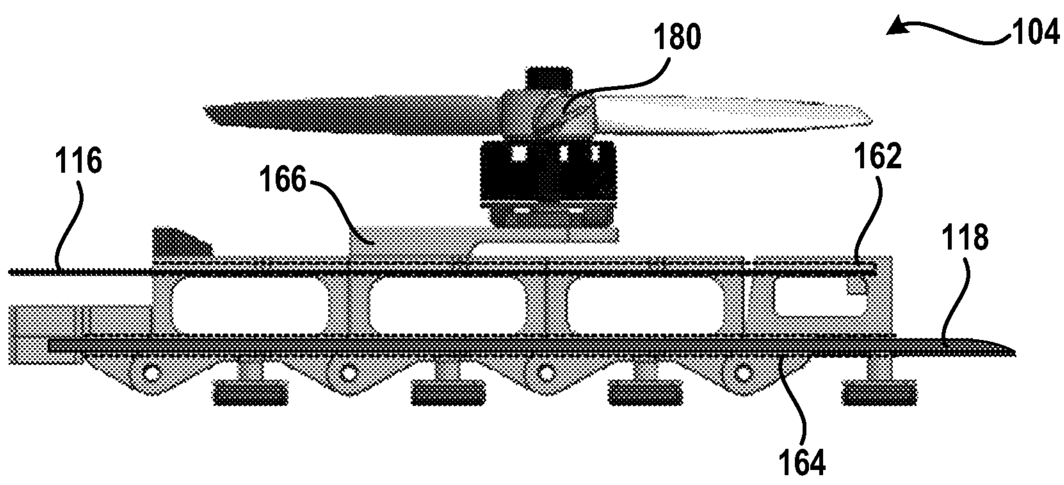
FIG. 2F is an illustration showing additional aspects of an arm of the vehicle of FIGS. 2A-2E.
Figure 2G:
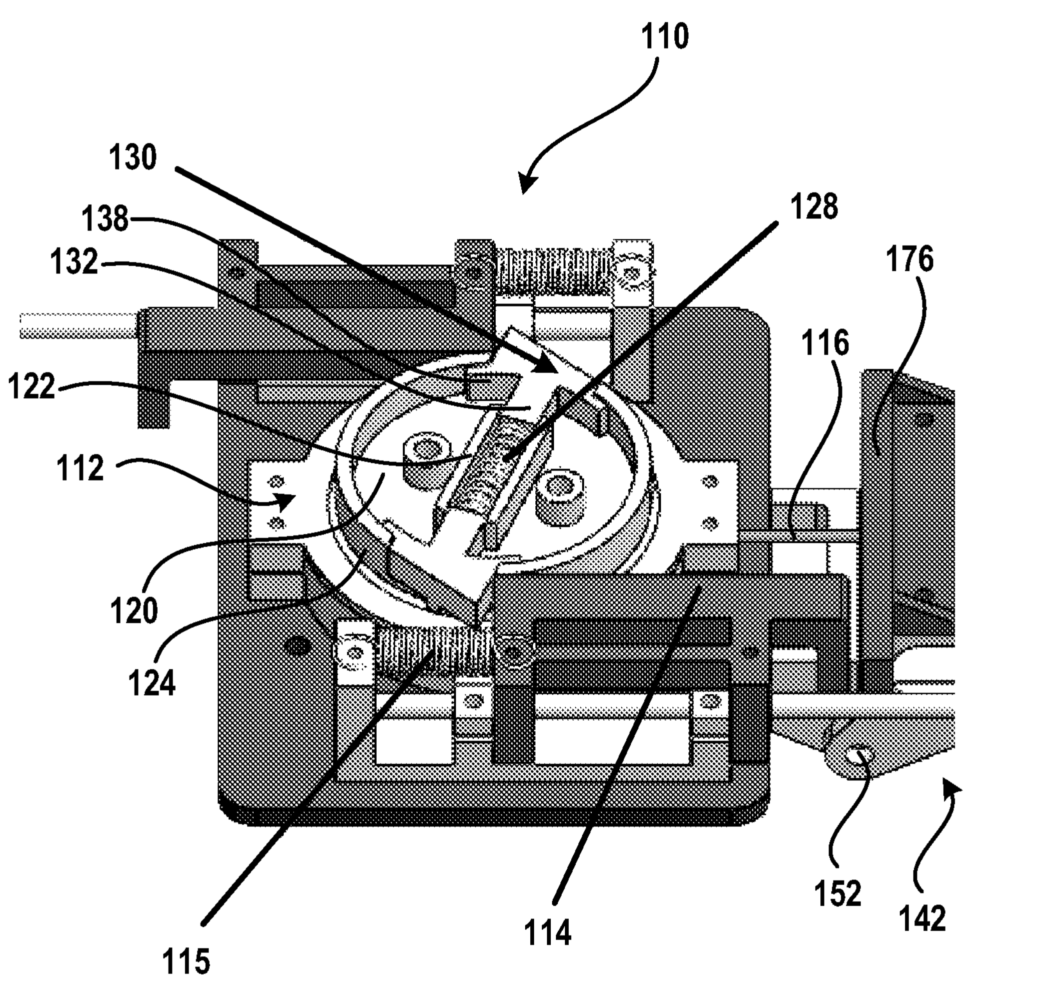
FIG. 2G is an illustration showing an enlarged view of an actuation mechanism of the vehicle of FIGS. 2A-2F.

FIG. 2B shows an arrangement of an arm 104 of the plurality of arms 104 in operative association with an actuation mechanism 110 (which can be positioned along the body 102 as shown in FIG. 2A). FIGS. 2C-2E respectively show the arm 104 in the first linkage state (state "0", FIG. 2C), the second linkage state (state "1", FIG. 2D), and the third linkage state (state "2", FIG. 2E). As outlined further herein, FIG. 2F shows additional elements of the arm 104 that enable transitioning between the first linkage state (state "0", FIG. 2C), the second linkage state (state "1", FIG. 2D), and the third linkage state (state "2", FIG. 2E). FIG. 2G shows an enlarged view of the actuation mechanism 110 from FIG. 2B. FIGS. 2H-2K show sequential views of operation of the actuation mechanism 110 discussed further herein.

Linkage Structure

Referring to FIGS. 2B-2G, each arm 104 of the plurality of arms 104 can include a linkage structure 140 configurable in a first linkage state (state "0", FIG. 2C), a second linkage state (state "1", FIG. 2D), and a third linkage state (state "2", FIG. 2E). The linkage structure 140 can be substantially aligned along a horizontal plane H when in the first linkage state (FIG. 2C) and can be configured to curve below the horizontal plane H when in the second linkage state (FIG. 2D) or the third linkage state (FIG. 2E).

As shown, the linkage structure 140 can include a leading link 142 which can be a proximal-most link of the linkage structure 140 that interacts with the actuation mechanism 110 and couples along the body 102 at a leading hinge 152, discussed in further detail herein. The leading hinge 152 can be located along a bottom of the linkage structure 140 to rotatably couple the leading link 142 to the body 102. Further, the leading link 142 can include a bumper element 176 positioned above the leading hinge 152 that receives a lateral force against the leading link 142 provided by the actuation mechanism 110 (e.g., from a slider element 114 of the actuation mechanism 110 discussed further herein), where application of the lateral force against the leading link 142 causes the leading link 142 to rotate about the leading hinge 152 below the horizontal plane H as illustrated in FIG. 2D.

The linkage structure 140 can include a distal link 148 which can be a distal-most link of the linkage structure 140, and one or more intermediate links therebetween (shown in FIG. 2C as first intermediate link 144 that couples with the leading link 142 at a first intermediate hinge 154, and second intermediate link 146 that couples with the first intermediate link 144 at a second intermediate hinge 156). Distal link 148 can be coupled to a preceding link (e.g., second intermediate link 146) at a distal link hinge 158.

As further shown, each arm 104 can be associated with a rotor 180 which can include one or more blades 182 that define a rotor plane R (FIGS. 2C and 2E). The rotor 180 can be rotatable by a rotor motor 108 responsive to one or more rotor control signals from a controller device 200. The rotor plane R can be oriented substantially parallel with the horizontal plane H of the linkage structure 140 when the linkage structure 140 is in the first linkage state (FIGS. 1B, 2C) or the third linkage state (FIGS. 1D, 2E), thereby enabling the vehicle 100 to fly when in either the first linkage state (FIGS. 1B, 2C) or the third linkage state (FIGS. 1D, 2E). As shown in FIGS. 1D and 2E, when in the third linkage state, a distal portion of the linkage structure 140 can curve underneath a proximal portion of the linkage structure 140. This enables the vehicle to grasp and object while flying when in the third linkage state of FIGS. 1D and 2E. FIGS. 2E and 2F show the rotor 180 coupled along a midpoint of the linkage structure 140 at a rotor mount 166.

In addition, each arm 104 can include one or more contact pads 168 along a bottom side of the arm that enable grasping an object with minimal damage. Depending on the use case of the vehicle, the contact pads 168 can include foam, rubber, sensor devices, etc.

Actuation Mechanism—Cable

As shown in FIGS. 2B-2G, each arm 104 of the plurality of arms 104 can encapsulate a cable 116 extending along a top side of the linkage structure 140, starting at the actuation mechanism 110 and terminating at the distal link 148. FIG. 2F shows the arm 104 having a cable channel 162 running through the linkage structure 140 that encapsulates the cable 116 along the top of the arm 104. As illustrated in further detail herein, the actuation mechanism 110 can be configured to straighten the arm 104 by drawing the distal end of the cable 116 towards the body 102. In a further aspect, as shown in FIG. 2B, the cable 116 can be connected at the distal link 148 by cable compression springs 174 which are biased to maintain the distal end of the cable 116 at a distal-most position of the distal link 148 until the cable 116 is drawn or otherwise retracted towards the body 102 when straightening the arm 104. The cable compression springs 174 ensure that each pair of arms (e.g., first arm 104A paired with second arm 104B and sharing the first actuation mechanism 110A, third arm 104C paired with fourth arm 104D and sharing the second actuation mechanism 110B) of the vehicle 100 can be fully retracted even if their cable lengths are slightly different.

The cable 116 can be coupled to the actuation mechanism 110 by a spool (not shown) such that rotation of a ratchet gear of the actuation mechanism 110 (e.g., by a servo motor) winds the cable 116 into the actuation mechanism 110 and draws the distal end of the cable 116 towards the body 102.

Actuation Mechanism—Bistable Spring Element

As illustrated in FIGS. 2B-2G, each arm 104 of the plurality of arms 104 can encapsulate a bistable spring element 118 extending along a bottom side of the linkage structure 140, the bistable spring element 118 being configured to transition from a first spring state (e.g., a straightened state shown in FIG. 2C) to a second spring state (e.g., a curled state shown in FIGS. 2D and 2E) upon application of the lateral force against a leading link 142 of the linkage structure 140. The first spring state can correlate with the first linkage state (state "0", FIG. 2C), and the second spring state can correlate with the second linkage state (state "1", FIG. 2D), and the third linkage state (state "2", FIG. 2E). Transitioning the bistable spring element 118 from the first spring state to the second spring state can be achieved by rotation of the leading link 142 about the leading hinge 152 below the horizontal plane H (e.g., to bend or "snap" the bistable spring element 118 so that it "curls up"). FIG. 2F shows the arm 104 having a spring element channel 164 that encapsulates the bistable spring element 118 within the linkage structure 140 along the bottom of the arm 104.

When transitioning the linkage structure 140 back to the first linkage state from the second linkage state or the third linkage state as discussed in further detail herein, the bistable spring element 118 must be straightened from the second spring state back to the first spring state. The linkage structure 140 can define a clearance area 172 (labeled in FIG. 2B) between the distal link 148 and a preceding link (e.g., second intermediate link 146) associated with the distal link 148 that enables rotation of the distal link 148 above the horizontal plane H when drawing the distal end of the cable 116 towards the body 102 (as in FIGS. 6A and 6B) to transition the bistable spring element 118 from the second spring state (or the third spring state) to the first spring state.

Actuation Mechanism—Ratchet Gear

As shown in FIGS. 2B and 2G-2K, the actuation mechanism 110 can include a ratchet gear 112 having a tooth element 130 (two tooth elements 130 are shown per ratchet gear 112, one per associated arm). The tooth element 130 can include a contact surface 134 (labeled in FIGS. 2H and 21) that applies a lateral force against the leading link 142 of the linkage structure 140 upon rotation of the ratchet gear 112 in a first (counterclockwise) rotational direction, thereby transitioning the linkage structure 140 from the first linkage state (FIG. 2C) to the second linkage state (FIG. 2D) or the third linkage state (FIG. 2E). The ratchet gear 112 can be rotatable by a servo motor 106 that can selectively rotate the ratchet gear 112 in the first rotational direction or the second rotational direction responsive to one or more ratchet gear control signals from a controller device 200.

The ratchet gear 112 can be in operative association with a slider element 114 positioned between the contact surface 134 of the ratchet gear 112 and the leading link 142 of the linkage structure 140. The slider element 114 receives the lateral force from the contact surface 134 of the tooth element 130 and translates the lateral force to the bumper element 176 of the leading link 142 as shown.

Figure 2H:
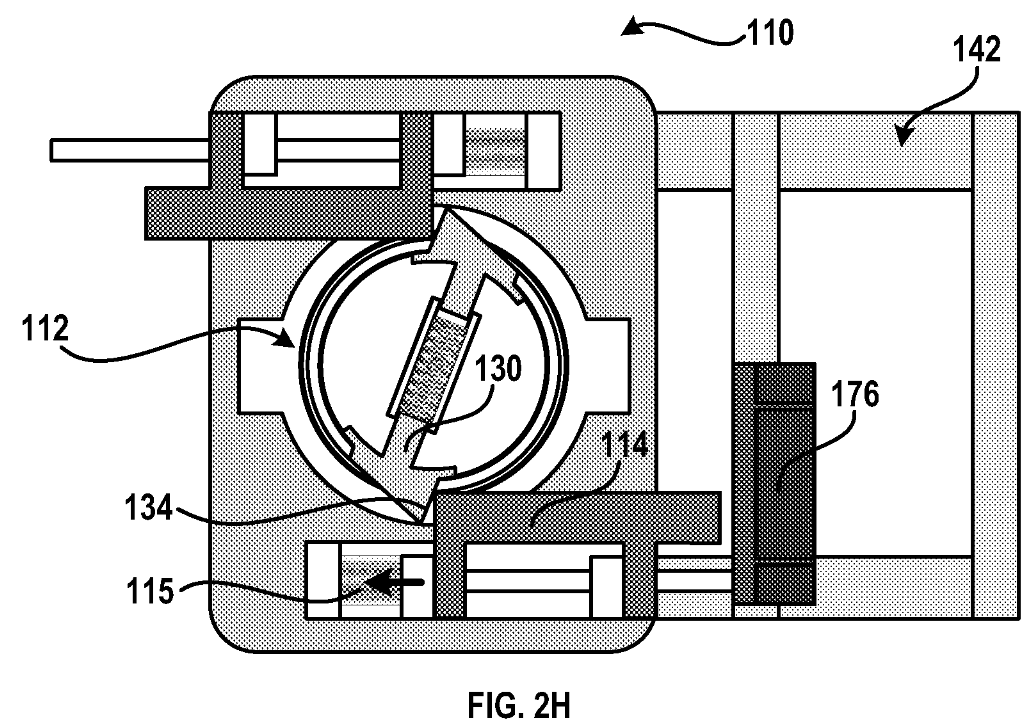
Figure 2I:
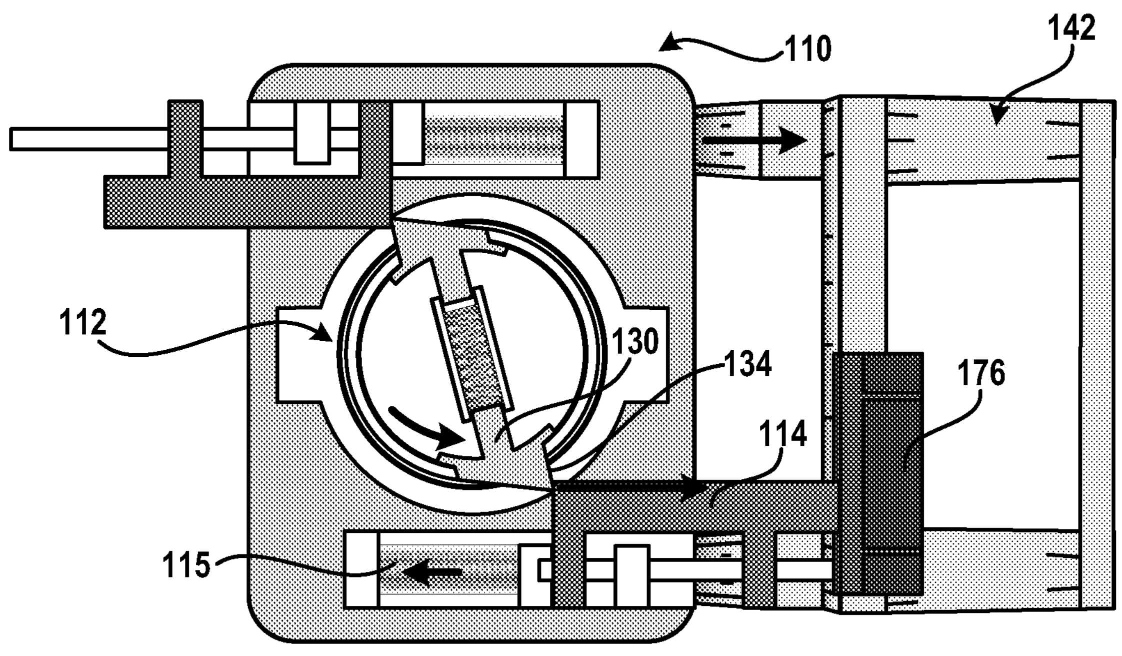

Actuation Mechanism—Transitioning from First Linkage State to Second Linkage State As illustrated in FIGS. 2H and 21, rotation of the ratchet gear 112 in the first (counterclockwise) rotational direction causes the contact surface 134 of the ratchet gear 112 to apply a lateral force against the slider element 114, which in turn applies the lateral force against the bumper element 176 of the leading link 142. This action causes rotation of the leading link 142 about the leading hinge 152 below the horizontal plane H, which in turn causes the bistable spring element 118 to transition from the first spring state to the second spring state. This results in transitioning the linkage structure 140 from the first linkage state (FIG. 2C) to the second linkage state (FIG. 2D). In a further aspect, the slider element 114 can be associated with an extension spring 115 that, absent application of the lateral force against the slider element 114 by the contact surface 134 of the ratchet gear 112, withdraws the slider element 114 inward towards the body 102.

Figure 2J:
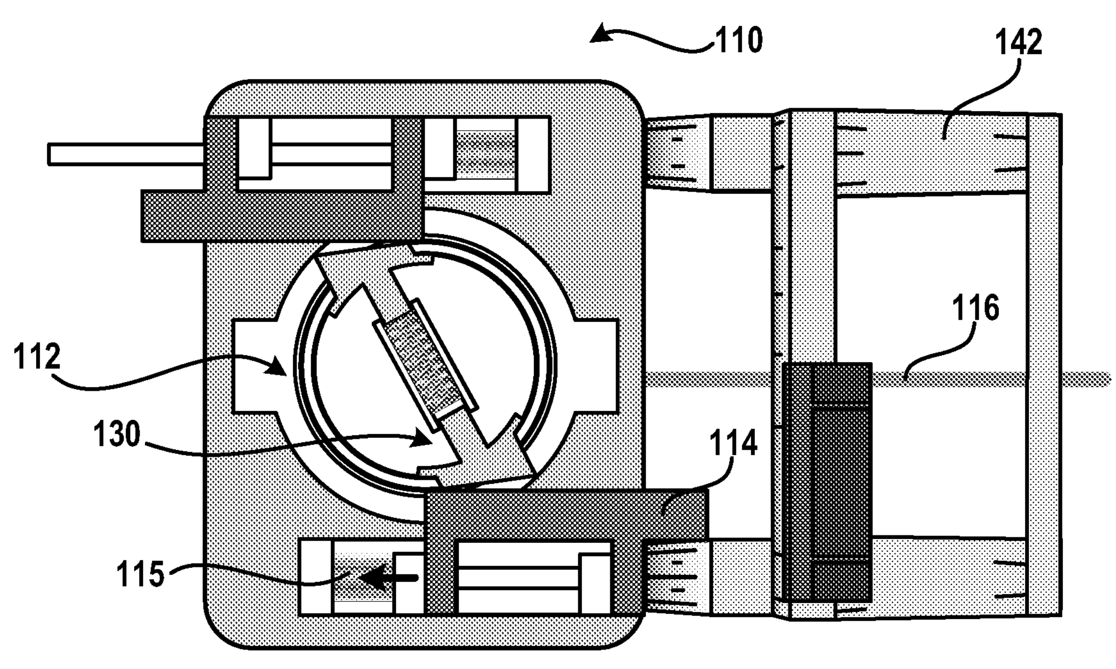
FIGS. 2J and 2K are a pair of illustrations showing rotation of an actuation mechanism of the vehicle of FIGS. 2A-21 in a second rotational direction.
Figure 2K:
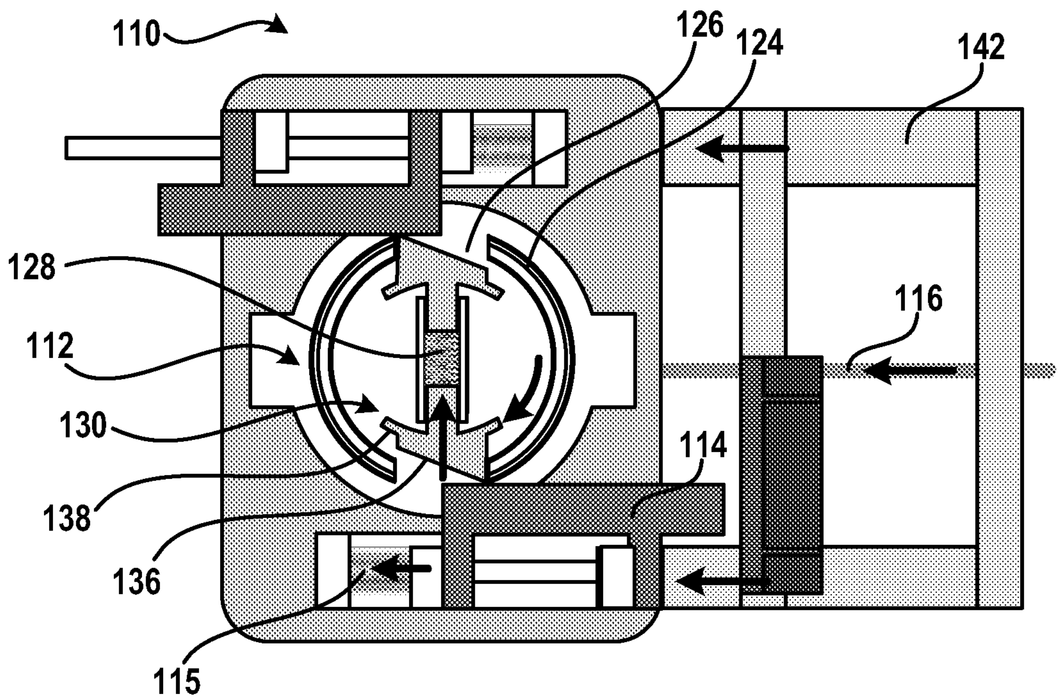

Actuation Mechanism—Transitioning from Second Linkage State to Third or First Linkage State and Transitioning from Third Linkage State to First Linkage State As shown in FIGS. 2J and 2K, the actuation mechanism 110 can straighten the linkage structure 140 by drawing the distal end of the cable 116 towards the body 102 upon rotation of the ratchet gear 112 in a second rotational direction (e.g., clockwise), thereby transitioning the linkage structure 140 from the second linkage state (FIG. 2D) or the third linkage state (FIG. 2E) to the first linkage state (FIG. 2C). The cable 116 can be coupled to the actuation mechanism 110 by a spool (not shown) such that of the ratchet gear 112 in a second rotational direction winds the cable 116 into the actuation mechanism 110 and draws the distal end of the cable 116 towards the body 102.

The tooth element 130 can include a tapered surface 136 opposite the contact surface 134 as shown in FIGS. 2J and 2K. Sufficient rotation of the ratchet gear 112 in the second (clockwise) rotational direction causes the slider element 114 to contact the tapered surface 136 and apply an inward radial force against the tooth element 130 that pushes the tooth element 130 inward towards a rotational axis of the ratchet gear 112. This prevents actuation of the slider element 114 when the ratchet gear 112 is rotated in the second (clockwise) rotational direction so as not to interfere with the straightening of the linkage structure 140.

With additional reference to FIG. 2G, the ratchet gear 112 can include a gear body 120 defining a tooth capture channel 122 and a gear wall 124. The gear wall 124 can include a tooth aperture 126 (two are shown in FIG. 2K) which aligns with the tooth capture channel 122. The tooth capture channel 122 can receive a portion of a tooth element body 132 of the tooth element 130 when the tooth element 130 is pushed inward towards a rotational axis of the ratchet gear 112. To ensure that the tooth element 130 returns to the position of FIG. 2J when the tapered surface 136 is no longer in contact with the slider element 114, the tooth capture channel 122 can include a tooth compression spring 128 which is biased to push the contact surface 134 and tapered surface 136 outward beyond the gear wall 124. The tooth element 130 can include stopper tabs 138 that contact an interior of the gear wall 124 when the position of FIG. 2J to ensure that the tooth element 130 remains at least partially positioned within the tooth capture channel 122 of the ratchet gear 112.

Controller Device

Figure 3A:
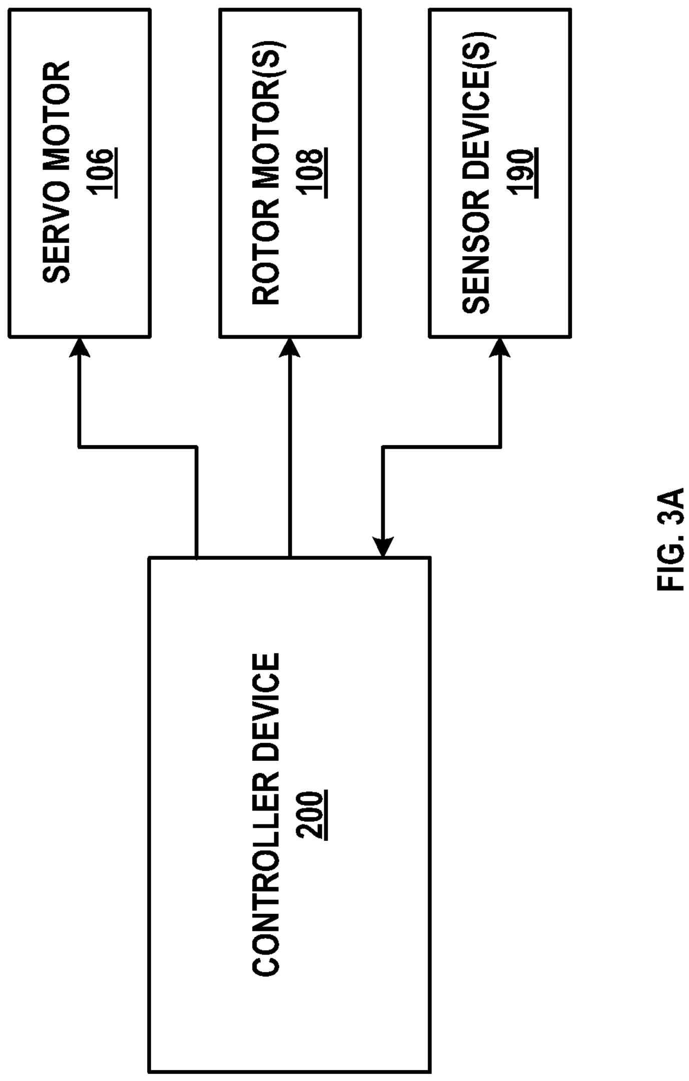
FIGS. 3A-3C are a series of diagrams showing a controller of the vehicle of FIGS. 2A-2K.
Figure 3B:
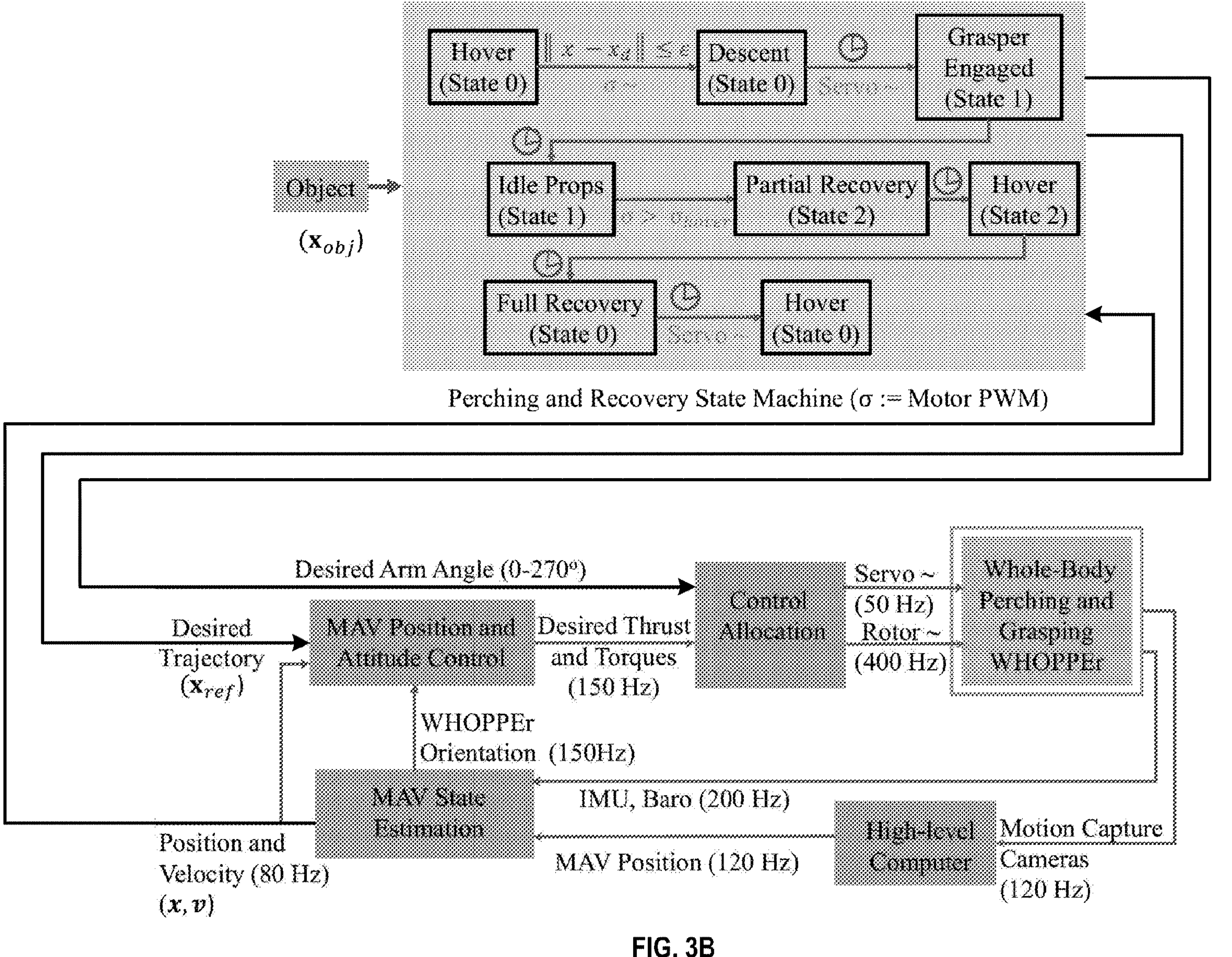
Figure 3C:
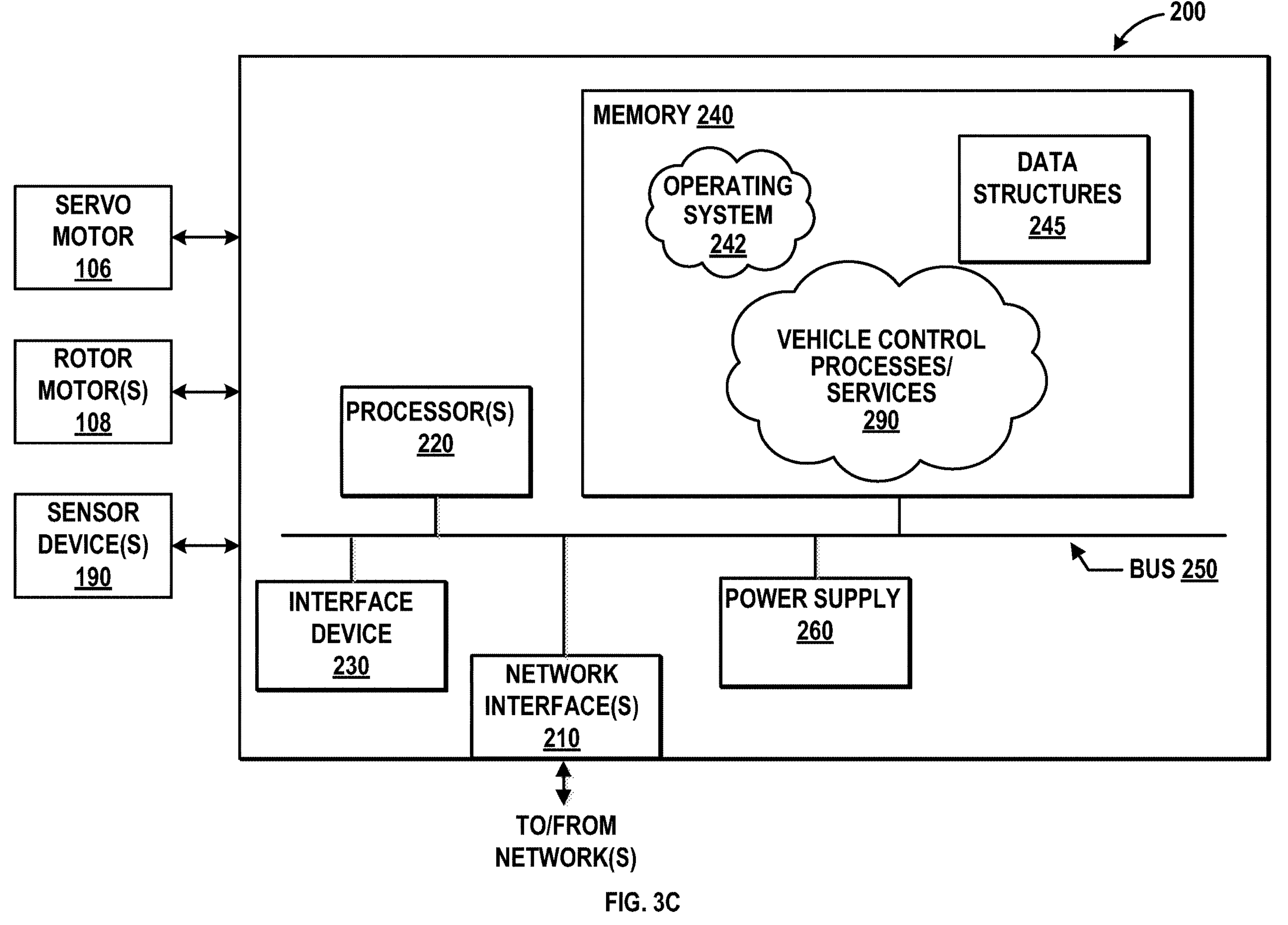

Referring to FIGS. 3A-3C, a controller device 200 of the vehicle 100 can communicate one or more one or more ratchet gear control signals to a servo motor 106 associated with an actuation mechanism 110, and can communicate one or more rotor control signals to rotor motor(s) 108 associated with a rotor 180. Further, the controller device 200 can communicate with one or more sensor device(s) 190 which can be used for controlling the actuation mechanism 110 and the rotors 180, e.g., through state estimation/control. FIG. 3B is a diagram showing communication between various components of the controller device 200 and the vehicle 100, including a closed-loop control architecture and perching strategy. Controller device 200 can implement a perching and recovery state machine as in FIG. 3B, a position and attitude control module, a control allocation module, a state estimation module, and a high-level computer for position estimation. Sensor device(s) 190 can include those required for state/position/attitude estimation such as but not limited to: an inertial measurement unit (IMU), a barometer, a position sensor, motion-capture cameras, and the like.

FIG. 3C is a schematic block diagram of an example controller device 200 that may be used with one or more embodiments described herein, e.g., as a component of vehicle 100.

Device 200 comprises one or more network interfaces 210 (e.g., wired, wireless, PLC, etc.), at least one processor 220, and a memory 240 interconnected by a system bus 250, as well as a power supply 260 (e.g., battery, plug-in, etc.). Device 200 can also include or otherwise communicate with an interface device 230 which can include one or more input/output devices that enable a user to input data or controls, and to view or otherwise access output data. Input/output devices can include but are not limited to a monitor, a touch-screen, joystick, a keyboard, a mouse, and the like.

Network interface(s) 210 include the mechanical, electrical, and signaling circuitry for communicating data over the communication links coupled to a communication network. Network interfaces 210 are configured to transmit and/or receive data using a variety of different communication protocols. As illustrated, the box representing network interfaces 210 is shown for simplicity, and it is appreciated that such interfaces may represent different types of network connections such as wireless and wired (physical) connections. Network interfaces 210 are shown separately from power supply 260, however it is appreciated that the interfaces that support PLC protocols may communicate through power supply 260 and/or may be an integral component coupled to power supply 260.

Memory 240 includes a plurality of storage locations that are addressable by processor 220 and network interfaces 210 for storing software programs and data structures associated with the embodiments described herein. In some embodiments, device 200 may have limited memory or no memory (e.g., no memory for storage other than for programs/processes operating on the device and associated caches). Memory 240 can include instructions executable by the processor 220 that, when executed by the processor 220, cause the processor 220 to implement aspects of the vehicle 100 and associated methods outlined herein.

Processor 220 comprises hardware elements or logic adapted to execute the software programs (e.g., instructions) and manipulate data structures 245. An operating system 242, portions of which are typically resident in memory 240 and executed by the processor, functionally organizes device 200 by, inter alia, invoking operations in support of software processes and/or services executing on the device. These software processes and/or services may include vehicle control processes/services 290, which can include aspects of the methods and/or implementations of various modules described herein, including those shown in FIG. 8B. Note that while vehicle control processes/services 290 is illustrated in centralized memory 240, alternative embodiments provide for the process to be operated within the network interfaces 210, such as a component of a MAC layer, and/or as part of a distributed computing network environment.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules or engines configured to operate in accordance with the techniques herein (e.g., according to the functionality of a similar process). In this context, the term module and engine may be interchangeable. In general, the term module or engine refers to model or an organization of interrelated software components/functions. Further, while the vehicle control processes/services 290 is shown as a standalone process, those skilled in the art will appreciate that this process may be executed as a routine or module within other processes.

System Characterization

In this section, the grasping and structure characterization of the drone for various scenarios is described.

Grasping Characterization

A set of static pulling experiments as shown in FIGS. 4A-4F was carried out to better understand the grasping force of the arm design for the drone. Two shapes were selected for the objects to grasp: a rectangular box and a rectangular box with rounded edges. The width of the objects is always 140 mm and the height is one of 30 mm, 50 mm, and 70 mm. Therefore, there are a total of six different objects and three trials are performed for each object. The experiment was done utilizing a universal tensile testing machine (UTM) (Instron 5944, Instron Corp., High Wycombe, United Kingdom). For each trial, a pair of arms and the object is first mounted on the UTM. The distance between the object and the foam pads of the arms was set to 5 mm. After the arm was triggered by its respective servo and wraps around the object, the UTM pulls the object straight away from the arm at a speed of 1 mm/s until the arms completely lose contact with the object or the force exceeds 30N to avoid damaging the drone. The elapsed time, displacement, and force exerted on the object was recorded at 10 Hz. In post-processing, the force data was filtered with a second-order Butterworth low-pass filter with a cutoff frequency of 0.05 Hz to remove the fluctuations caused by small slippage and noise from the buckling of the tape springs. The arm is considered to lose its grasp if there is a sudden big slippage, which roughly correlates to a decrease in the force of 0.2N for the last 1 mm based on examinations of the experiment footage and data.

Figure 4A:
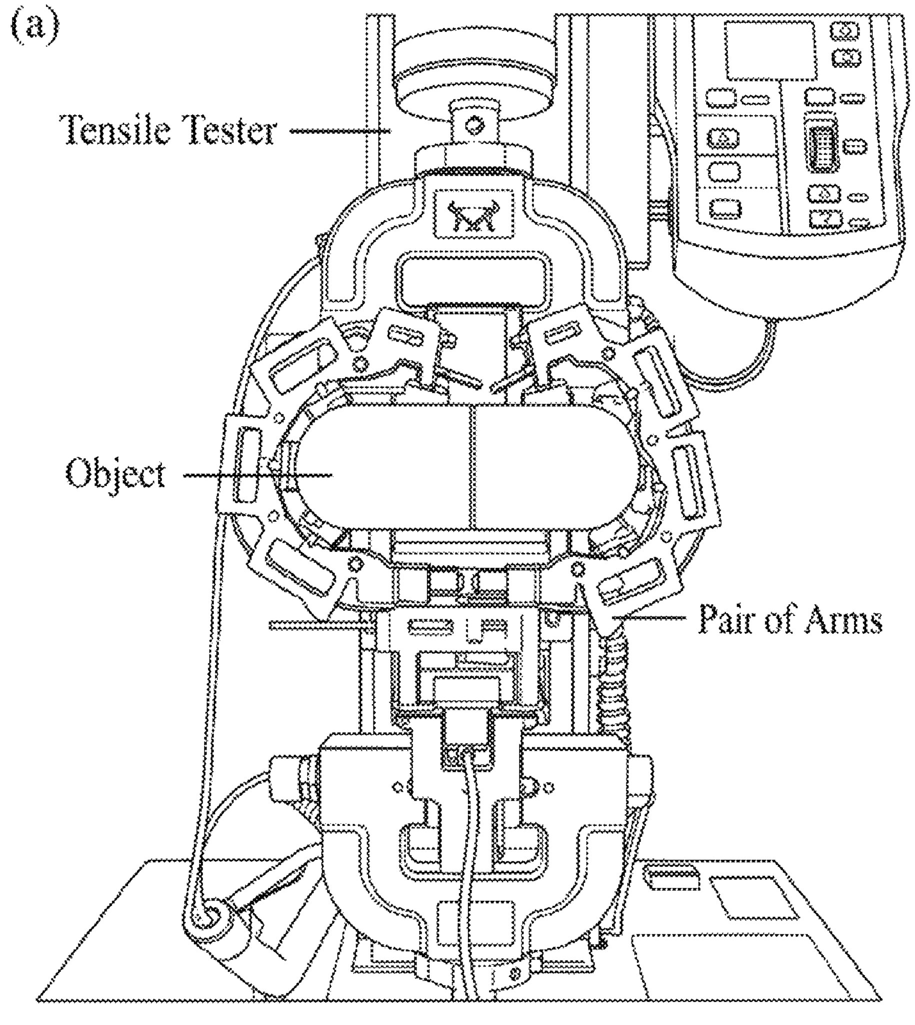
FIGS. 4A-4F are images of the drone showing the grasper characterization experiment setup with the grasper holding rounded rectangular objects at a 70 mm height (FIG. 4B), a 50 mm height (FIG. 4A), and a 30 mm height (FIG. 4C) and the drone grasping a rectangular object at a 70 mm height (FIG. 4D), a 50 mm height (FIG. 4E), and a 30 mm height (FIG. 4F) in which the width of the rectangular object is 140 mm.
Figures 4B, 4C, 4D, 4E, 4F:
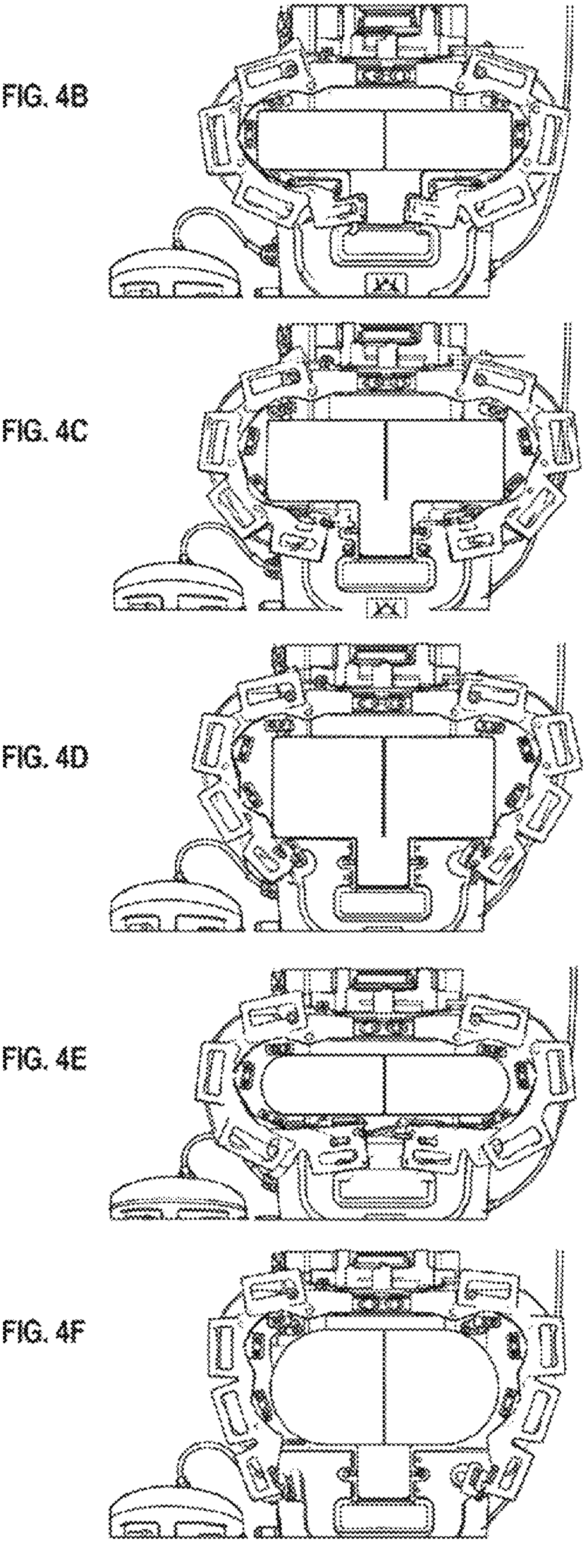
Figure 5:
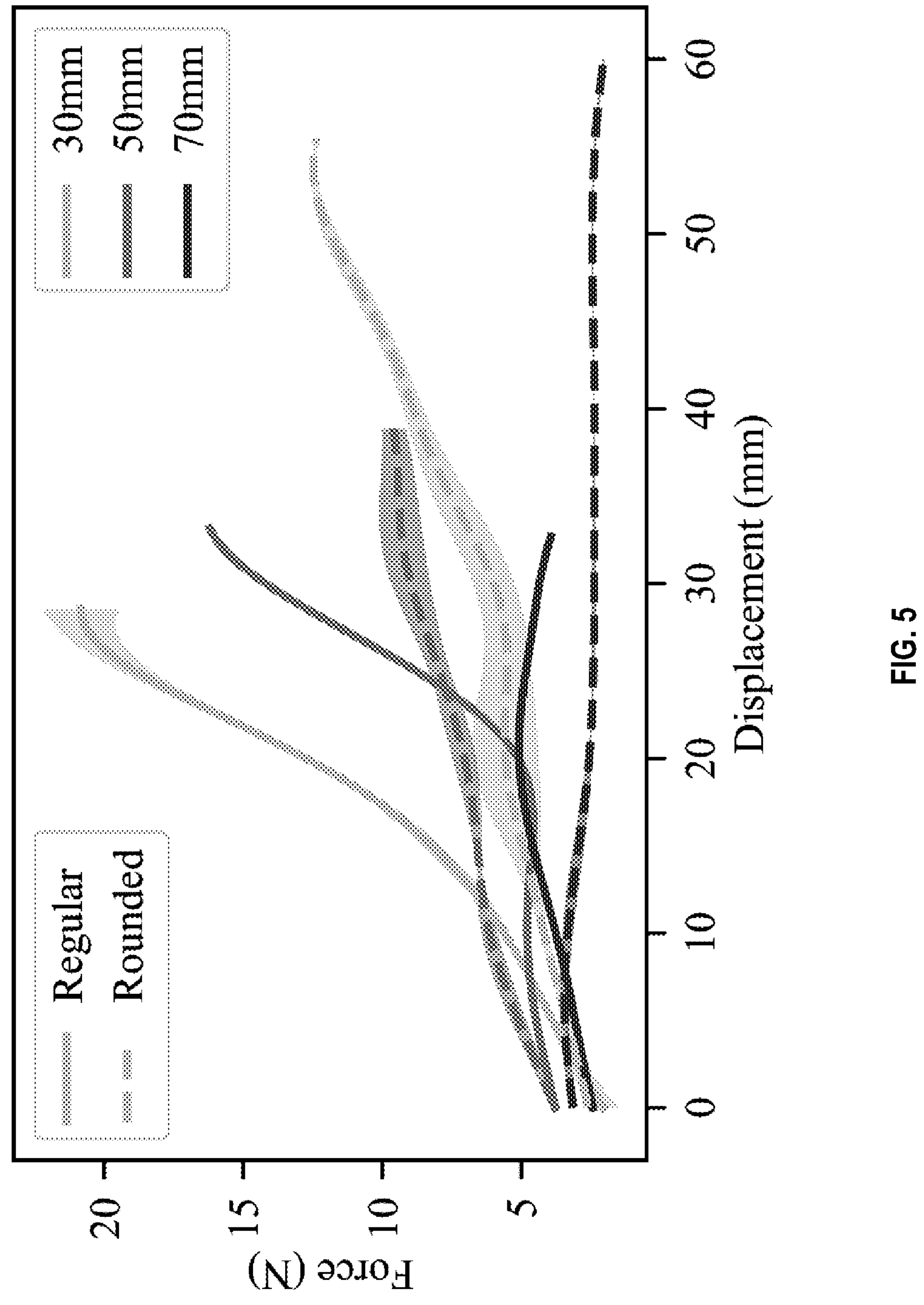
FIG. 5 is a graphical representation showing the grasping force of the drone versus the displacement with different object shapes.

As shown from the results plotted in FIG. 5, the pair of arms was found to perform better when grasping rectangular boxes without rounded edges and reaches a maximum grasping force of over 20N1 for the one with 30 mm height. This is likely due to the 90-degree corners getting caught into the gaps between the foam pads as shown in FIG. 4D, which does not happen for the rounded edges as shown in FIGS. 4A-4F. On the other hand, the more evenly distributed contact force between the arms and the rounded objects delays slippage, extending the holding range up to 60 mm for the rounded object with 70 mm height. Another trend is that as the height of the object increases, the grasping force decreases because the arms fail to fully wrap around the object.

Structure Characterization

Figures 6A, 6B:
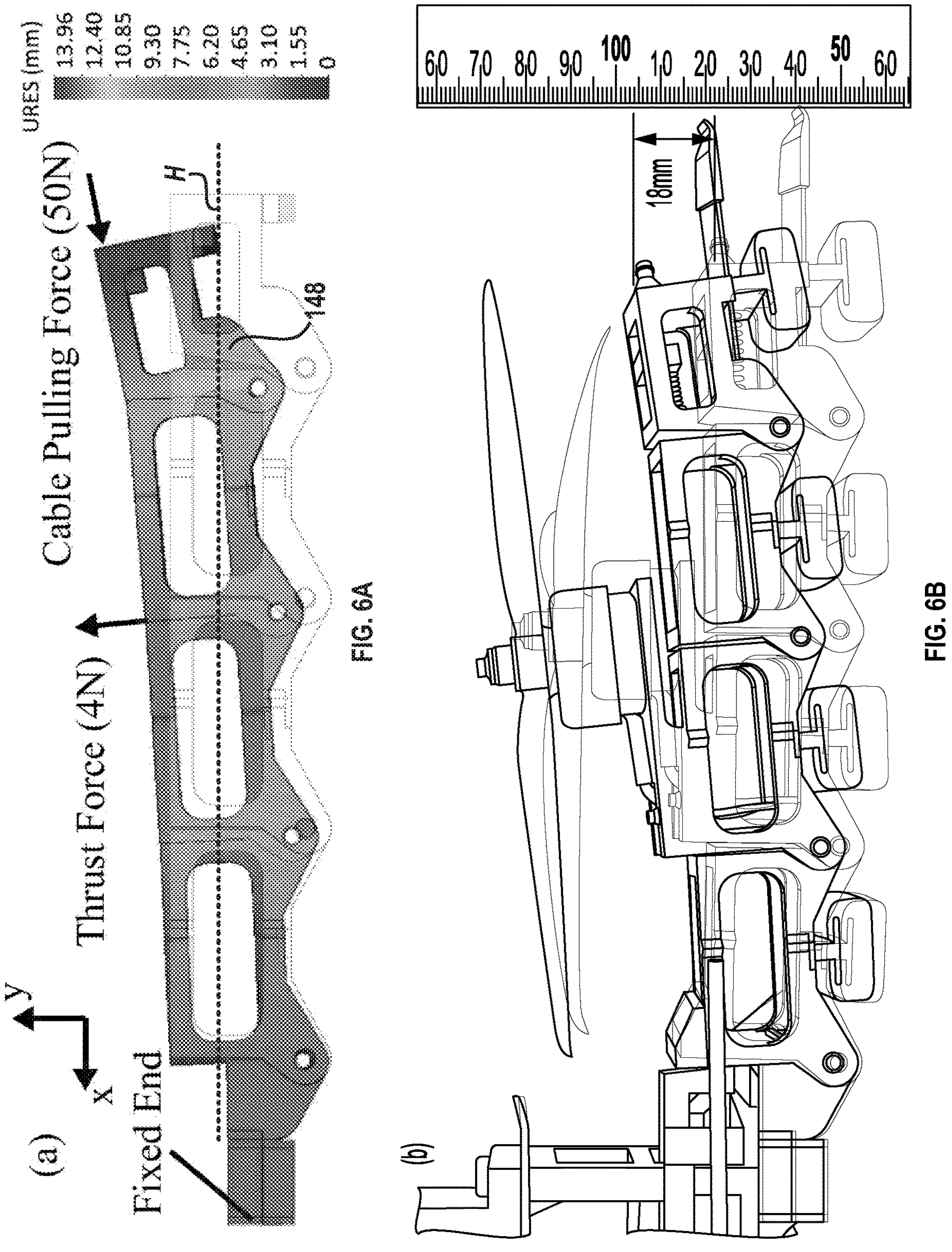
FIG. 6A is an illustration of simulation results showing maximum deflection of the arm under loading condition.
FIG. 6B is an image of the drone showing the maximum deflection as observed during experimentation.

As mentioned above, a minimum deflection of at least 10 mm in the direction of the positive y-axis (FIGS. 6A-6B) is desired to unbuckle the bistable tape spring used in the arm to switch from State 1 or 2 to State 0 as shown in FIGS. 2A-2F. To assess the arm design of the drone, static stress analysis using appropriate material, fixtures, and connections is done using the SolidWorks simulation tool as shown in FIG. 6A. The simulation results show a maximum deflection of 13.96 mm under the thrust force (4N) in the positive y-axis, and the cable pulling force (50N) in the positive x-axis direction. The experimental results under the same loading condition showed a deflection of 18 mm as shown in FIG. 6B.

Figures 7A, 7B:
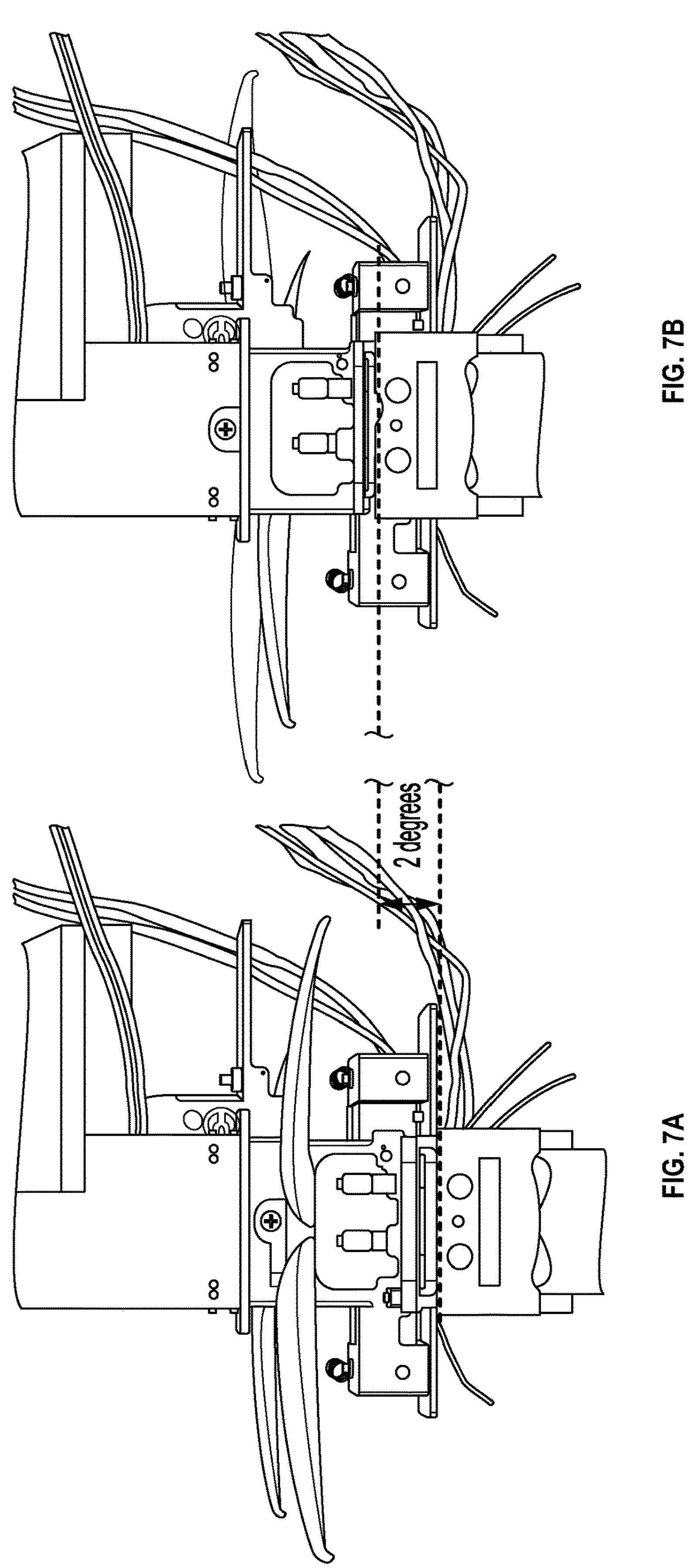
FIG. 7A is an image of the drone showing a torsional deflection of zero.
FIG. 7B is an image of the drone showing the torsional deflection at full throttle.

For evaluating the effects on aerodynamics due to any torsional characteristics of the drone arm, we employ a high-speed camera at 500 fps (Edgetronics SC1, CA, USA) was employed to record the experiment and use this data to visually calculate the angular deflection due to torsional moment. These values come to about 2 degrees as shown in FIGS. 7A-7B. Furthermore, it was inferred that since the structure is symmetrical, the aerodynamic losses due to bending, shown in FIG. 6B, are minor and the drone retains normal flight albeit with some aerodynamic losses.

Control of WHOPPEr

Modeling and Control

In this section, the robust adaptive controller for WHOPPEr to perform successful perching and payload delivery missions will be discussed.

Let $x \in \mathbb{R}^3$, $v \in \mathbb{R}^3$ denote the position and velocity of the drone in the world frame. Then, if $R \in \mathbb{R}^{3\times3}$ denotes the orientation of the system in the world frame and $\Omega \in \mathbb{R}^3$ denotes the body-frame angular velocity, we can express the dynamics of the drone as $$\dot{x} = v,\ m\dot{v} = mge_3 - fRe_3 \tag{1a}$$

$$\dot{R} = R\hat{\Omega},\ J\dot{\Omega} = [J\Omega]_{\times}\Omega = \tau + \delta \tag{1b}$$

where m denotes the unknown mass of the entire drone, $[f\ T]^T$ denote the control inputs of thrust, $f \in \mathbb{R}$ and torques $t \in \mathbb{R}^3$ respectively and $J \in \mathbb{R}^{3\times3}$ denotes the moment of inertia.

The controller is modified from a conventional geometric controller on SE(3) to account for the change in mass due to different payloads. A model reference adaptive controller (MRAC) was implemented for the translational dynamics to improve the tracking performance of the drone for adaptive payloads. Specifically, the MRAC is employed to estimate the mass whenever there is an additional payload since this unaccounted mass addition adversely affects the z-direction trajectory. MRAC was chosen since the translational dynamics of the drone have a known form of a second-order system and the control specifications can be neatly specified in the form of the desired response. The dynamics of this reference plant, $\ddot{x}_m(t)$, was chosen as the following:

$$\ddot{x}_m + \lambda_1\dot{x}_m + \lambda_2 x_m = \lambda_2 x_d(t) \tag{2}$$

with the reference model output $x_m \in \mathbb{R}$ being the ideal mass parameter. The parameters $\lambda_1=2$, $\lambda_2=5$ were tuned to follow the desired reference $x_d(t)$. The control thrust f is then generated according to:

$$f = -(-k_x e_x - k_v e_v - \hat{m}ge_3 + \hat{m}\ddot{x}_d)\cdot Re_3 \tag{3a}$$

$$\dot{\hat{m}} = -\gamma v s \tag{3b}$$

$$s = \dot{\tilde{x}} + \lambda\tilde{x} \tag{3c}$$

$$v = \ddot{x}_m - 2\lambda\dot{\tilde{x}} - \lambda^2\tilde{x} \tag{3d}$$

where $\tilde{x}(t) := x(t) - x_m(t)$. This is similar to the conventional thrust generation techniques for drones, but with the adjustable parameter $\hat{m}$. Since the quantity m in (1) is not known exactly, therefore an estimate of m, $\hat{m}$, is obtained from the proposed parameter estimator law (3b)-(3d). This value of m, is then employed to generate the required f. We choose $\gamma=0.5$ and $\lambda=1$ to achieve a critically damped response for trajectory tracking in the z-direction.

Furthermore, the change in the drone's inertia vector is modeled as fixed inertia with bounded uncertainty such that $\|\delta\| \le \Delta$. A robust controller has accordingly been implemented in the attitude loop to address the modeling uncertainty with $\Delta=0.01$ as the bound on uncertainty.

Figures 8A, 8B:
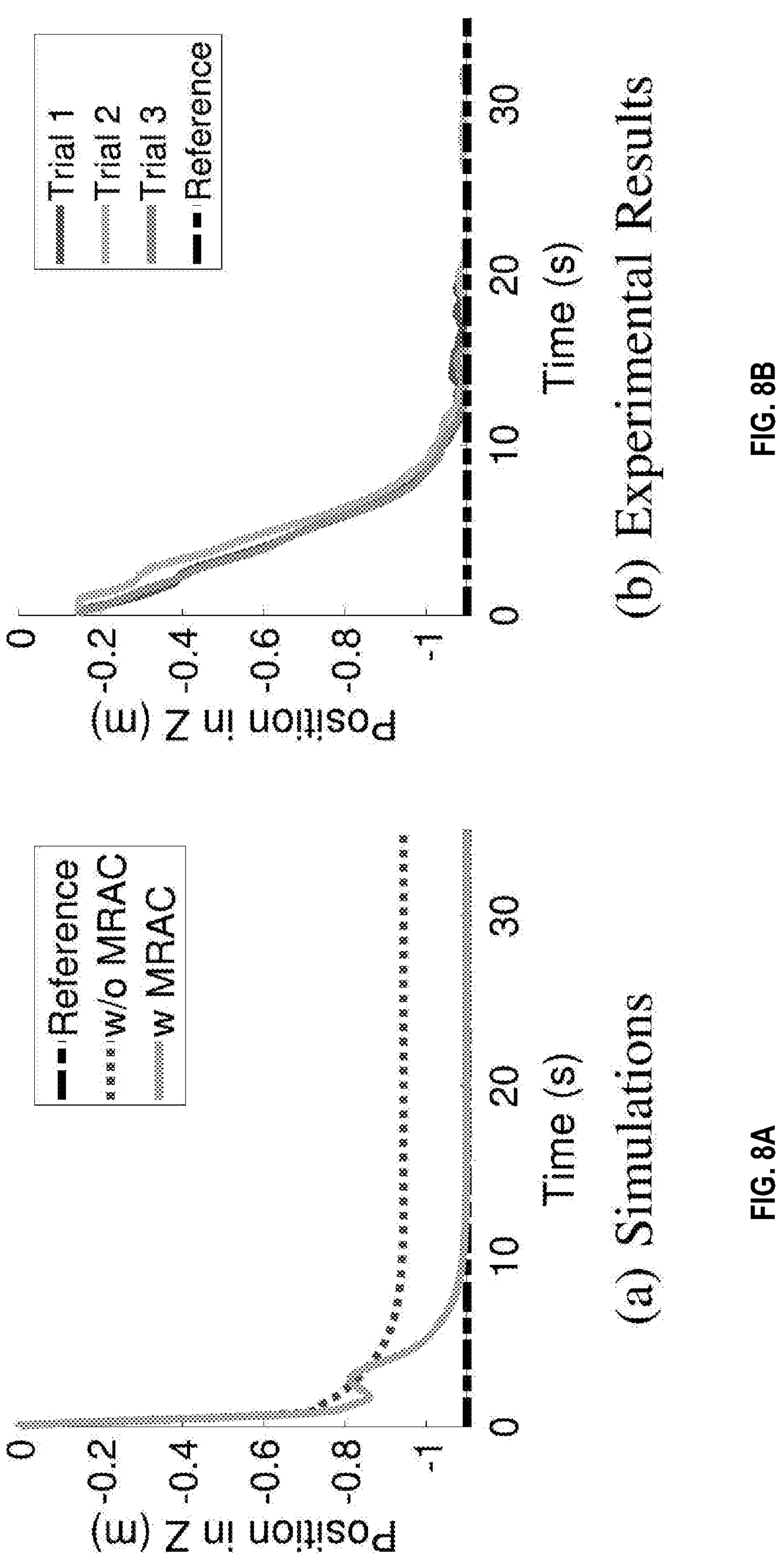
FIGS. 8A and 8B are graphical representations showing a comparison of the tracking performance in a z direction at hover conditions for the adaptive flight controller for the drone.

Simulation results and comparison with experiments for a hover test are shown in FIGS. 8A-8B. For the simulation, the tracking maneuver was initialized with an initial mass estimate $\hat{m}(0)=1.5$ kg while the actual mass $m=1.7$ kg. It was shown that without MRAC, there is a steady state error in the tracking performance as seen in FIG. 8A. This adaptive controller is implemented on the flight control unit and overall, the 3D tracking error has a root-mean-square error (RMSE) of 2.83 cm for real experiments as shown by the consistent tracking performance for three trials in FIG. 8B.

Experimental Results

As discussed herein, the commercial off-the-shelf flight controller Pixhawk4 with an UPBoard was used as the high-level companion computer for all our experiments. The complete closed-loop control architecture is shown in FIGS. 3A-3C. ROS2 was used to communicate between the high-level companion computer and the flight controller via an RTPS bridge. In this section, experimental results with the drone in two case scenarios demonstrated—(i) an indoor perching and recovery task and (ii) a payload delivery task. All the experiments were conducted in an indoor drone studio at ASU using a motion capture system (OptiTrack, NaturalPoint Inc, OR) for obtaining the localization data and 3D pose estimation of the drone.

Perching and Recovery

Figures 9A, 9B:
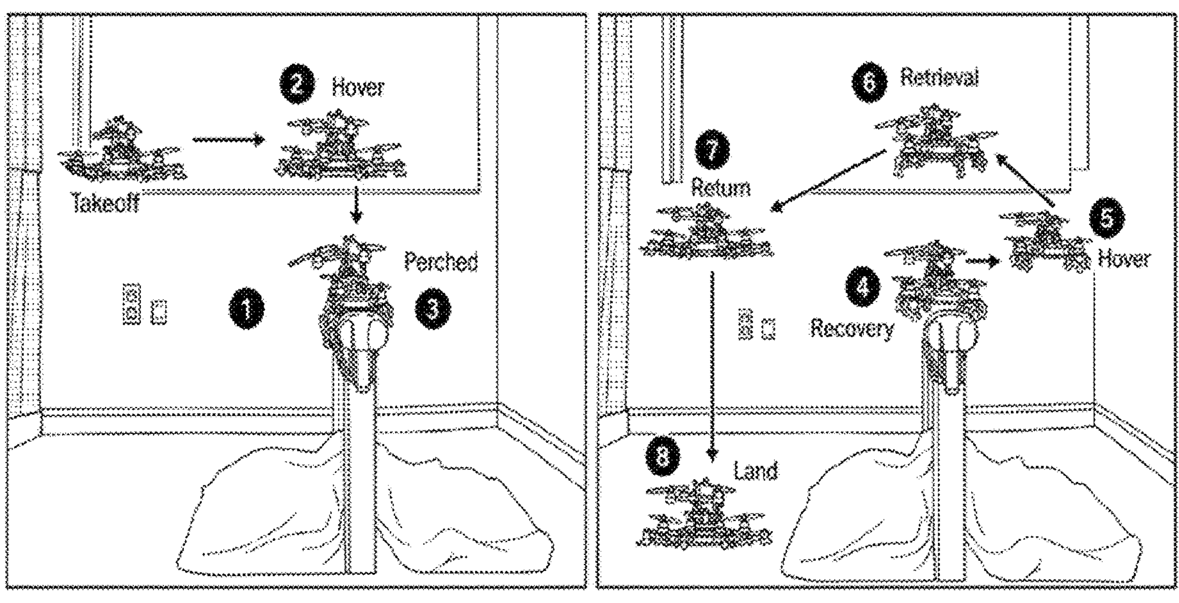
FIGS. 9A and 9B are images of the drone performing autonomous perching, recovery, and retrieval demonstration during experiments.
Figure 9C:
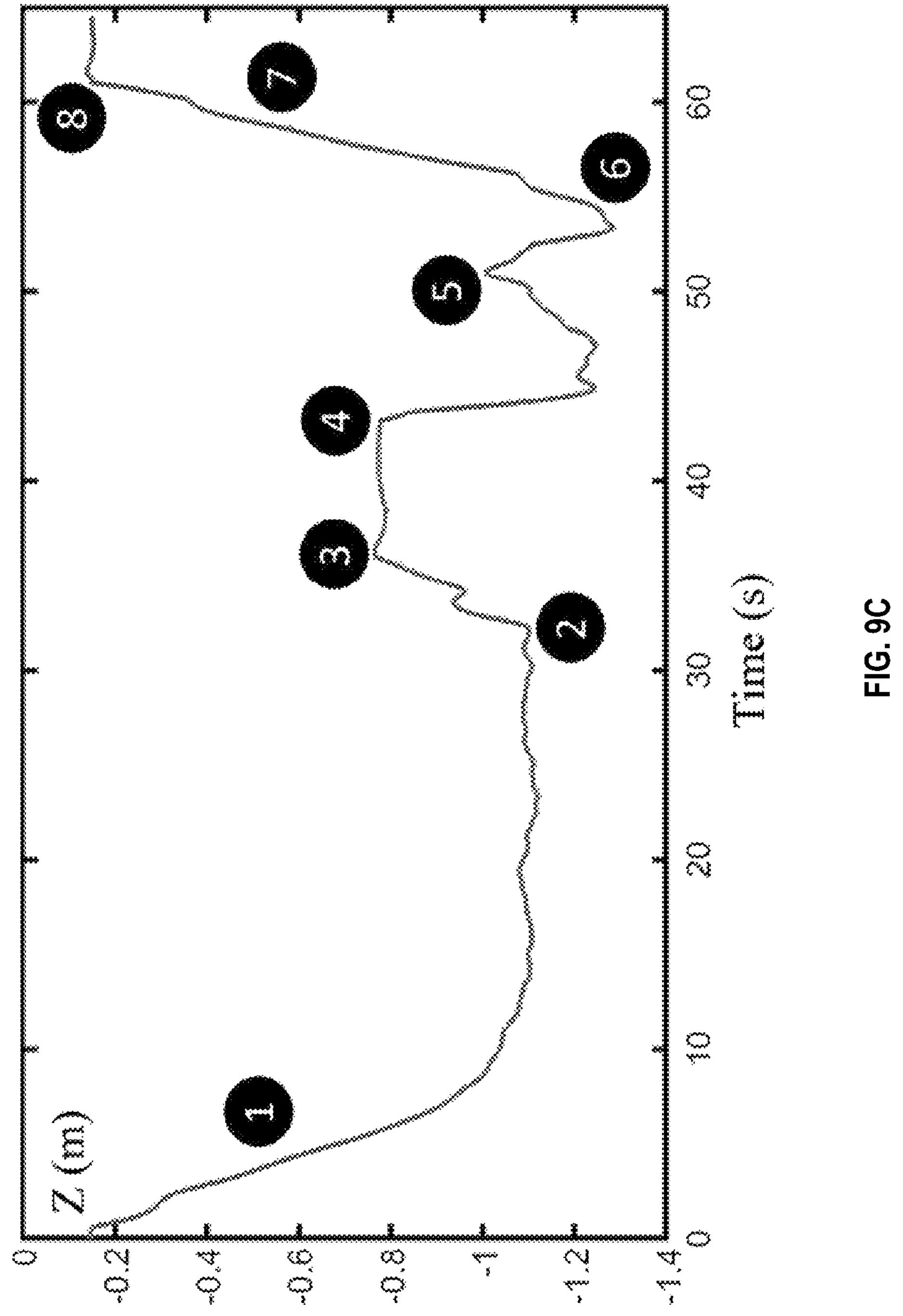
FIG. 9C is a graphical representation showing the z trajectory of the drone during a maneuver.

The perching strategy of the drone is implemented as described in FIG. 3B. The screenshots from the experimental demonstration are shown in FIGS. 9A and 9B and the corresponding z-trajectory plot is shown in FIG. 9C. Individual markings depict each distinct state of the entire perching and recovery maneuver of the drone. First, the drone takes off, shown by marking (1), reaches a desired hover target location (2), and then initiates a vertical descent toward the target object. After a set time duration, the servos are used to activate the arms of the drone to perch as shown by marking (3) and go to State 1. Note that the wait time to engage the servo is tuned after multiple trials to be around 2 seconds.

Next, after a user-specified wait time, the drone initiates the recovery and returns to the home maneuver. The propeller thrust is sufficient to release the grasp and bring the arms to a plane such that motors are upright, as discussed herein. This State 2 is marked by (4) after which the drone then tries to hover at a specified location with the arms partially engaged as shown by marking (5). Finally, the servo is employed to completely retract the arms, shown by markings (6) and (7) to go to State 0, and land at the home position, marking (8). It was shown that the performance of the controller is not affected by the arm engaging and disengaging process, as shown by the tracking performance before and after the perching. However, during the arm retrieval in positions labeled by (5)-(7), while in hover, there was a slight height loss due to the disturbance introduced by the retrieval mechanism shown by marking (5) in FIGS. 9A-9C. This height loss was quickly recovered and the drone flown back to the home position for landing. This perching experiment was repeated multiple times and it is seen that since the controller is not robust to the ground effect, there is a drift of position while landing, leading to a land success rate of 60%. However, once the drone lands stably, it has a 100% perching success rate.

Payload Delivery

Figures 10A, 10B, 10C, 10D:
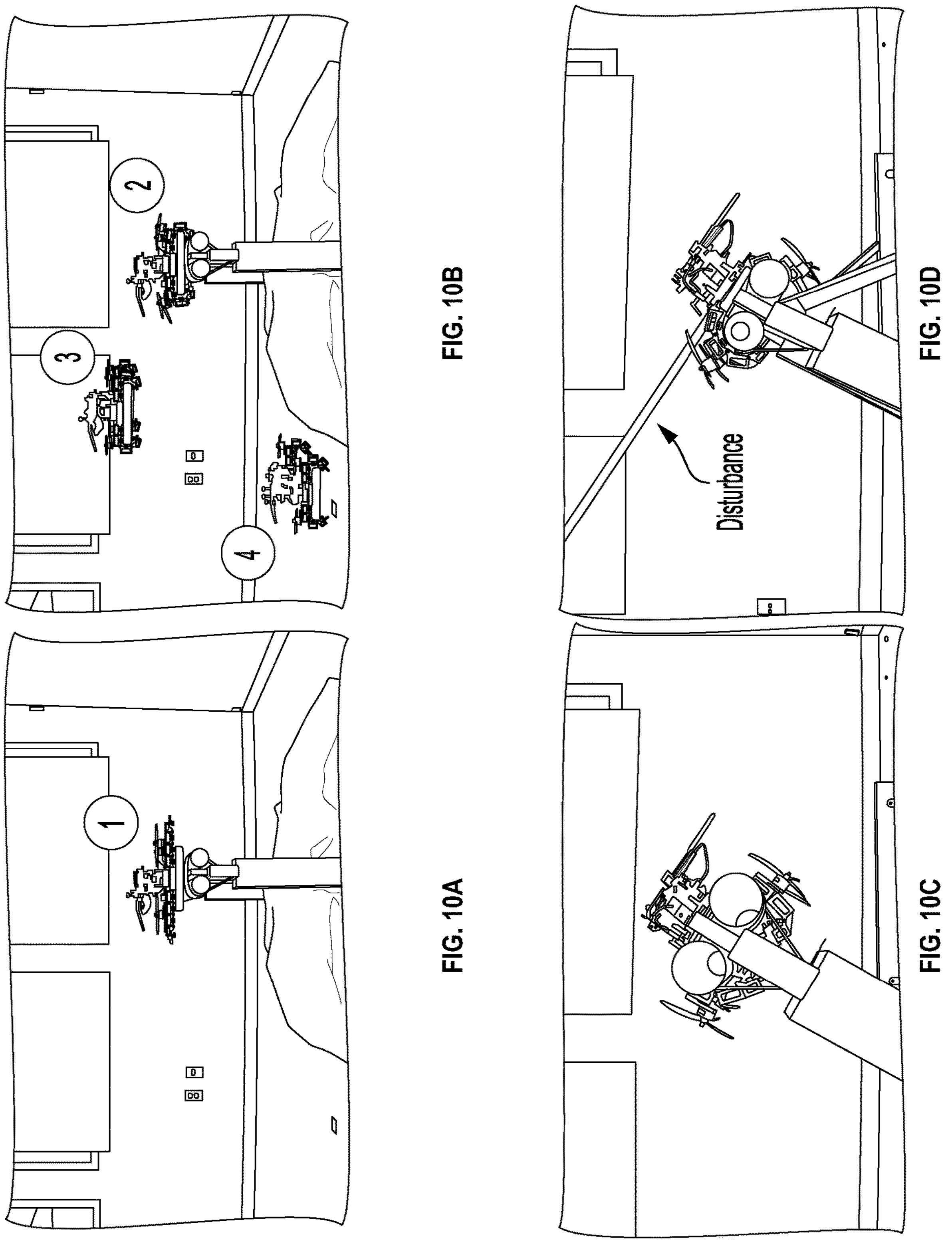
FIGS. 10A-10D are images from an experimental demonstration of the drone during an autonomous delivery task.

The capabilities of the drone for an autonomous delivery task were demonstrated as shown in FIGS. 10A and 10B. The drone's arms are used as graspers to hold a rectangular object of dimension 35 cm×20 cm×2 cm, weighing 80 grams, and deliver at a specified target location. In FIGS. 10A-10D, marking (1) shows the marking where the payload is placed below the drone. The arm-based grasper of the drone is then engaged at marking (2), and the drone flies off with the payload, shown by marking (3) to deliver the load at the home position designated marking (4). The adaptive controller accounts for any change in mass and inertia as shown by the successful payload delivery experiments.

Angled Perch and Disturbance

It was also demonstrated that the drone can perform angled perching at an angle of 65 degrees from the horizontal reference line and when subject to manually induced disturbances, it resists the disturbance and maintains a robust perch as shown in FIGS. 10C and 10D.

CONCLUSION

In the present disclosure, a novel multirotor drone is disclosed which performs whole-body grasping for perching maneuvers. It was shown how this drone can withstand the impacts and disturbances during perching and yielded a robust perching maneuver. Also, the perching mechanism was fast and able to conform to objects of various sizes. The characterization shows that the drone may provide a maximum grasping force of 40N, which contributes to successful perching. The drone not only helps in robust perching but can also be used for camouflaging during pursuit applications. In addition to perching, it was further demonstrated the possibility of grasping objects with this morphology and extended our design for pick-and-place missions. Furthermore, the MRAC framework for the flight controller generates consistently good tracking performance for adaptive payloads and leads to successful autonomous perching, grasping, and recovery maneuvers.

For future work, more thorough experiments about the drone will be conducted including the payload size and weight limits in State 2, flight time and maneuverability with or without payload, more grasping and perching scenarios, and comparisons with other state-of-the-art implementations. Furthermore, further work on performing physics-based simulations to completely characterize the arms as graspers, for optimizing the design and further reducing its weight is contemplated. In addition, computer vision in the autonomous flight controller will be employed to detect strategic perch locations outdoors and attempt perching, thereby evaluating the performance of the overall system in more realistic settings. The ground effect encountered during the approach to the target will be modeled and compensated by the flight controller to perform aggressive perching maneuvers.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A vehicle, comprising:

a plurality of arms coupled along a body of the vehicle, each arm of the plurality of arms including:

a linkage structure configurable in a first linkage state, a second linkage state, and a third linkage state, the linkage structure being substantially aligned along a horizontal plane when in the first linkage state and being configured to curve below the horizontal plane when in the second linkage state or the third linkage state; and an actuation mechanism coupled along the body, the actuation mechanism including:

a ratchet gear having a contact surface that applies a lateral force against a leading link of the linkage structure upon rotation of the ratchet gear in a first rotational direction to transition the linkage structure from the first linkage state to the second linkage state or the third linkage state; and a cable encapsulated within and extending along a top side of the linkage structure, the actuation mechanism being configured to straighten the linkage structure by drawing a distal end of the cable towards the body upon rotation of the ratchet gear in a second rotational direction.

2. The vehicle of claim 1, each arm of the plurality of arms further comprising:

a bistable spring element encapsulated within and extending along a bottom side of the linkage structure, the bistable spring element being configured to transition from a first spring state to a second spring state upon application of the lateral force against the leading link of the linkage structure.

3. The vehicle of claim 2, the linkage structure including a distal link associated with the distal end of the cable, the linkage structure defining a clearance area between the distal link and a preceding link associated with the distal link that enables rotation of the distal link above the horizontal plane when drawing the distal end of the cable towards the body to transition the bistable spring element from the second spring state to the first spring state.

4. The vehicle of claim 1, the leading link of the linkage structure including:

a leading hinge along a bottom of the linkage structure that rotatably couples the leading link to the body; and a bumper element positioned above the leading hinge that receives the lateral force against the leading link;

wherein application of the lateral force against the leading link causes the leading link to rotate about the leading hinge below the horizontal plane.

5. The vehicle of claim 4, wherein rotation of the leading link about the leading hinge below the horizontal plane causes a bistable spring element encapsulated within the linkage structure to transition from a first spring state to a second spring state.

6. The vehicle of claim 1, the ratchet gear being in operative association with a slider element positioned between the contact surface of the ratchet gear and the leading link of the linkage structure, wherein rotation of the ratchet gear in the first rotational direction causes the contact surface of the ratchet gear to apply the lateral force against the slider element which translates the lateral force against the leading link.

7. The vehicle of claim 6, the slider element being associated with an extension spring that, absent application of the lateral force against the slider element by the contact surface of the ratchet gear, withdraws the slider element inward towards the body.

8. The vehicle of claim 6, the contact surface of the ratchet gear being associated with a tooth element of the ratchet gear, the tooth element having a tapered surface opposite the contact surface, wherein rotation of the ratchet gear in the second rotational direction causes the slider element to contact the tapered surface and apply an inward radial force against the tooth element that pushes the tooth element inward towards a rotational axis of the ratchet gear.

9. The vehicle of claim 1, further comprising:

a rotor coupled along a top side of the linkage structure and positioned along a midpoint of the linkage structure.

10. The vehicle of claim 9, wherein one or more blades of the rotor define a rotor plane that is substantially parallel with the horizontal plane when the linkage structure is in the third linkage state and wherein a distal portion of the linkage structure curves underneath a proximal portion of the linkage structure when in the third linkage state.

11. The vehicle of claim 9, wherein the plurality of arms are operable for grasping an object while flying when in the third linkage state.

12. The vehicle of claim 1, wherein the plurality of arms are operable for grasping an object when in the second linkage state.

13. A method, comprising:

applying a lateral force against a leading link of an arm of a plurality of arms of a vehicle, the arm being substantially aligned along a horizontal plane when in a first linkage state, the lateral force causing rotation of the leading link about a leading hinge below the horizontal plane to a second linkage state and causing a bistable spring element encapsulated within the arm to transition from a first spring state to a second spring state.

14. The method of claim 13, further comprising:

applying a ratchet gear control signal to a servo motor associated with a ratchet gear that causes rotation of the ratchet gear in a first rotational direction, wherein rotation of the ratchet gear in the first rotational direction causes the ratchet gear to apply the lateral force against the leading link of the arm.

15. The method of claim 13, further comprising:

drawing a distal end of a cable encapsulated within and extending along a top side of the arm towards a body of the vehicle that transitions the arm from the second linkage state to a third linkage state, wherein the plurality of arms are operable for grasping an object while flying when in the third linkage state.

16. The method of claim 15, the arm including a rotor coupled along a top side of the arm and positioned along a midpoint of the arm, wherein one or more blades of the rotor define a rotor plane that is substantially parallel with the horizontal plane when the arm is in the third linkage state and wherein a distal portion of the arm curves underneath a proximal portion of the arm when in the third linkage state.

17. The method of claim 13, wherein the plurality of arms are operable for grasping an object when in the second linkage state.

18. The method of claim 13, further comprising:

drawing a distal end of a cable encapsulated within and extending along a top side of the arm towards a body of the vehicle that transitions the arm to the first linkage state.

19. The method of claim 18, the arm including a distal link associated with the distal end of the cable, the arm defining a clearance area between the distal link and a preceding link associated with the distal link that enables rotation of the distal link above the horizontal plane when drawing the distal end of the cable towards the body to transition the bistable spring element from the second spring state to the first spring state.

20. The method of claim 13, further comprising:

applying a ratchet gear control signal to a servo motor associated with a ratchet gear that causes rotation of the ratchet gear in a second rotational direction, wherein rotation of the ratchet gear in the second rotational direction causes the ratchet gear to draw a distal end of a cable encapsulated within and extending along a top side of the arm towards a body of the vehicle.

* * * * *